(12) United States Patent
Taschereau

(10) Patent No.: US 7,577,244 B2
(45) Date of Patent: Aug. 18, 2009

(54) METHOD AND SYSTEM FOR PROVIDING GEOGRAPHICALLY TARGETED INFORMATION AND ADVERTISING

(76) Inventor: John Taschereau, 17482 60 Ave, Surrey, BC (CA) V3S 1T8

( * ) Notice: Subject to any disclaimer, the term of this patent is extended or adjusted under 35 U.S.C. 154(b) by 0 days.

(21) Appl. No.: 10/276,755

(22) PCT Filed: May 16, 2001

(86) PCT No.: PCT/CA01/00689

§ 371 (c)(1), (2), (4) Date: Jun. 10, 2003

(87) PCT Pub. No.: WO01/89183

PCT Pub. Date: Nov. 22, 2001

(65) Prior Publication Data

US 2004/0076279 A1    Apr. 22, 2004

(51) Int. Cl.
*H04M 3/42*    (2006.01)
*H04W 24/00*   (2009.01)

(52) U.S. Cl. .............................. 379/218.01; 455/456.3

(58) Field of Classification Search ............ 379/206.01, 379/218.01, 88.01, 88.17, 88.19, 88.23, 207.12, 379/88.18; 455/456.1, 456.3, 563
See application file for complete search history.

(56) References Cited

U.S. PATENT DOCUMENTS

| | | | | |
|---|---|---|---|---|
| 5,638,425 A | * | 6/1997 | Meador et al. | 379/88.01 |
| 5,727,057 A | * | 3/1998 | Emery et al. | 379/201.07 |
| 5,852,775 A | * | 12/1998 | Hidary | 455/412.1 |
| 5,917,889 A | * | 6/1999 | Brotman et al. | 379/88.01 |
| 6,058,179 A | | 5/2000 | Shaffer et al. | 379/220 |
| 6,539,080 B1 | * | 3/2003 | Bruce et al. | 379/88.17 |
| 6,714,631 B1 | * | 3/2004 | Martin et al. | 379/88.02 |
| 6,870,921 B1 | * | 3/2005 | Elsey et al. | 379/218.01 |

FOREIGN PATENT DOCUMENTS

| | | | |
|---|---|---|---|
| EP | 827321 A2 | * | 3/1998 |
| FR | 2736234 | | 1/1997 |
| WO | WO 99/56450 | | 11/1999 |

OTHER PUBLICATIONS

International Search Report for PCT/CA01/00689, Oct. 5, 2001.

* cited by examiner

*Primary Examiner*—Quochien B Vuong
(74) *Attorney, Agent, or Firm*—Kolisch Hartwell, P.C.

(57) ABSTRACT

A system and method of providing information based on the location of the target. The system is ideal for use with voice based technology, and uses street segments to allow users to identify their location by cross street. The system can target advertisements to users based on the location of the user, a destination location related to the information requested by the user and/or the route to be taken by the user to reach such destination location.

18 Claims, 14 Drawing Sheets

METHOD AND SYSTEM FOR PROVIDING GEOGRAPHICALLY TARGETED INFORMATION AND ADVERTISING

NOTICE REGARDING COPYRIGHTED MATERIAL

A portion of the disclosure of this patent document contains material which is subject to copyright protection The copyright owner has no objection to the facsimile reproduction by anyone of the patent document or the patent disclosure as it appears in the public Patent Office file or records but otherwise reserves all copyright rights whatsoever.

TECHNICAL FIELD

This invention relates to methods of requesting and targeting information based on the location of the requestor, and more specifically using natural language to allow such requestor to identify their location.

BACKGROUND

There are advantages in being able to provide phone users information based on their location. If the location of the phone user is known, then information about the nearest product or service can be provided (for example the cheapest gas station within a certain distance). Furthermore, advertisements can be targeted with precision, i.e. based on where the recipient of the advertisement is likely to be in the near future.

There are a number of systems in place for determining the location of a cellular phone user. For example the company known as Cell-Loc, Inc. provides a service to identify the location of cellular phone users. This system uses of triangulation, i.e. three receivers must receive the signal from the cellular phone in order to determine the location of the phone. This requires that three such receivers be in range of the telephone, which in turn has a certain expense. Furthermore, such a system will only work on phones that function as transmitters, i.e. cellular phones, and will not work with other phones. Another location based system is the GPS systems to locate the user. This requires satellites and the enormous cost inherent in providing same.

Systems which store geographic information commonly in use today store and index information by postal code or geographic longitude or latitude coordinates. Geographic Information Systems (GIS) provide spatial processing functionalities and are based on the minimal unit of longitude and latitude coordinates. Such systems build lines and polygons and perform computations and transformation on longitude and latitude coordinates. The user interface for such systems is generally a personal computer. Such systems are commonly used for thematic mapping, radio wave propagation studies, and transport infrastructure design.

SUMMARY OF THE INVENTION

A method of providing information to an information requestor is provided comprising the steps of: (a) the information requestor contacting an information source and making a request for information; (b) said information source obtaining a location reference from said requestor; and (c) said information source providing information to said requestor based on said location reference.

The location reference may be obtained from said requestor by said requestor providing a voice input and in step (c) an advertisement may be provided to said information requestor. The requestor may contact said information source and be provided said information via phone and the location reference may be determined by said requestor identifying a first cross street and a second cross street. The location reference may be determined using voice information provided by said requestor.

A system for providing information to an information requestor is provided comprising, an information source including means for receiving an information request; means for obtaining a location reference from said requestor; and means for providing information to said requestor based on said location reference. The means for obtaining a location reference from said requestor may comprise means for obtaining a first cross street and a second cross street from said requestor; and means for determining a location reference from said cross streets. The system may further comprise means for providing an advertisement to said requestor based on said location reference.

A method of obtaining information from a user is provided, comprising the steps of: (a) said user establishing voice communication with a database; (b) said user associating information with a location reference using said voice communication; and (c) said database storing said information in association with said location reference.

A method of accessing business information in a personal information manager is provided, comprising the steps of: (a) a user establishing a voice communications link with said personal information manager; and (b) said user accessing a database associated with said personal information manager using natural language.

A method of routing a requestor by a sponsor is provided, comprising the steps of (a) said requestor contacting an information source to obtain a route; (b) said information source selecting a route that passes by or through an establishment selected by said sponsor; and (c) providing said route to said requestor. Before step (c), the information source may provide an advertisement to said requestor.

BRIEF DESCRIPTION OF FIGURES

Further objects, features and advantages of the present invention will become more readily apparent to those skilled in the art from the following description of the invention when taken in conjunction with the accompanying drawings, in which.

DETAILED DESCRIPTION OF PREFERRED EMBODIMENTS

The system and method of the invention allows for the storage and retrieval of information in a geographic context. A component of the system and method is that of locating objects and information in a geographic context using voice recognition. Voice recognition software is widely known in the art and available under many brand names. The system and method according to the invention employ grammars to enable users of the system to use natural language speaking patterns rather than precise language to describe groups of segments (as further described below).

As used herein an information source means a database with means to communicate with a requestor, preferably by voice, although other communication means are also applicable.

Street Segments

The method and system according to the invention uses street segments as a basic geographic unit. A segment generally represents a portion or whole of a street where each end of the segment either terminates or intersects with one or more other segments. Street segment data is available from several vendors and is commonly called a "road network" or "street data set". In the United States, the US Census Bureau publishes a data set referred to as the TIGER (Topologically Integrated Geographic Encoding and Reference System) data set. Geographic Data Technology is another company in the United States which provides segment data. In Canada, Desktop Mapping Inc. vends a product called "CanMAP Street Files" with Canadian data. Similar data is available for many countries throughout the world.

Figure 1:
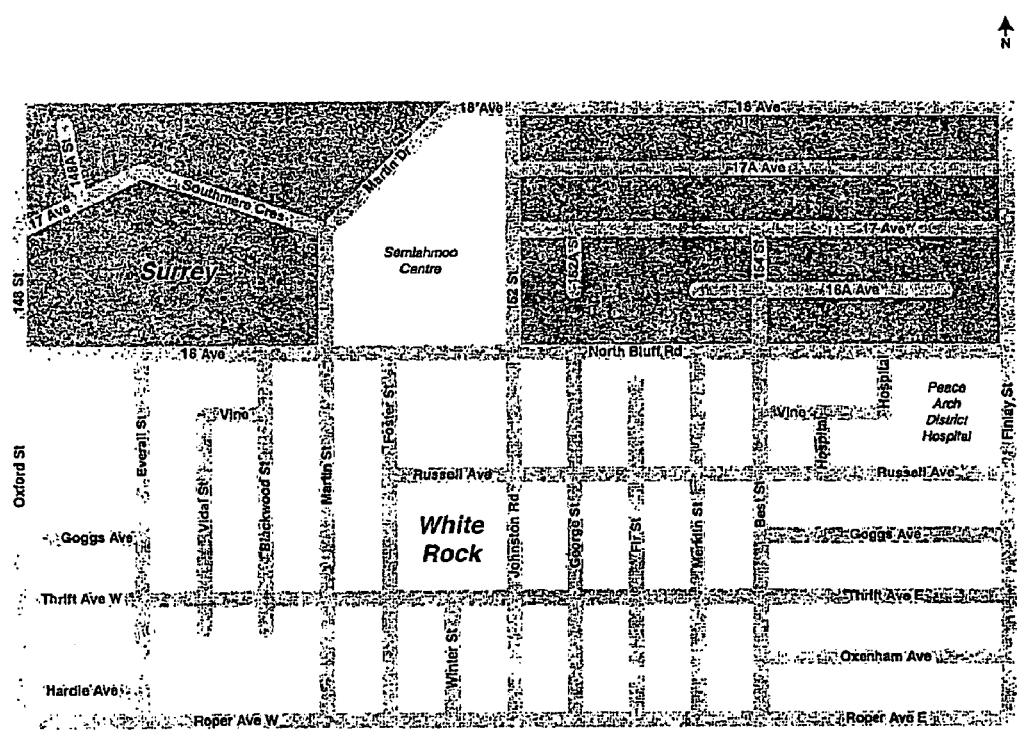
FIG. 1 is a map of an area showing the road structure and certain points of interest.
Figure 2:
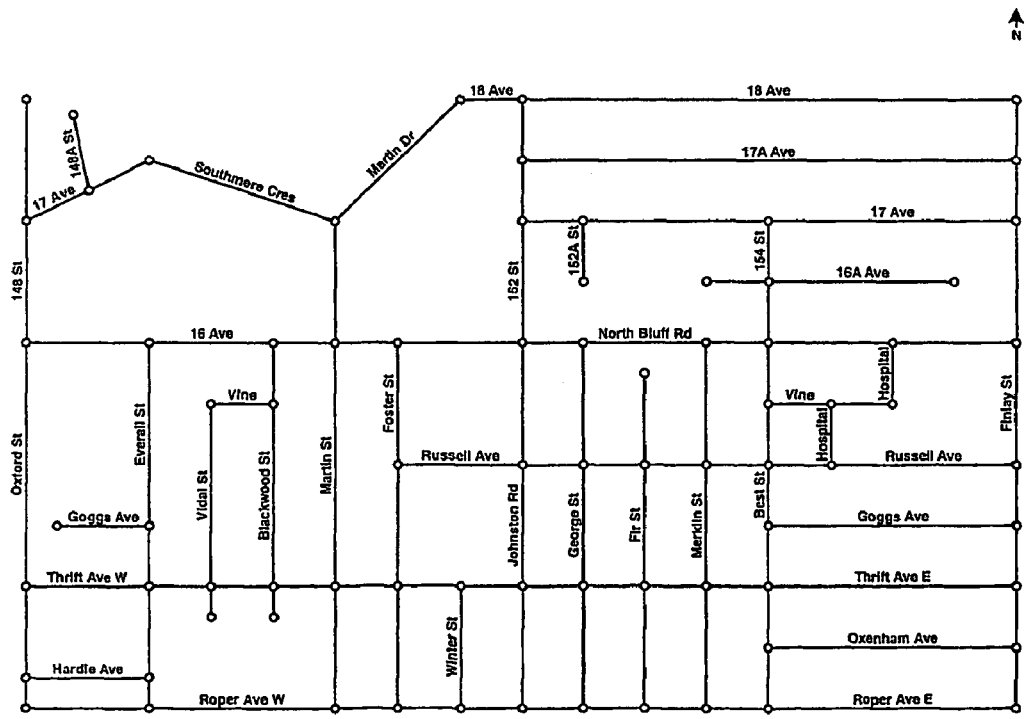
FIG. 2 is a graphical representation thereof showing the street segments.

The system described herein stores and processes information by creating relationships to portions of streets, generally representative of streets blocks, called segments. Segments are grouped together into groups to represent common, user defined and other purposeful entities, (also called spatial constructs). The system fundamentally operates on the notion of segment and groups and the representations and purposes of said groups. FIGS. 1 through 19 graphically show how segments are formed and placed into groups. In particular FIGS. 1 and 2 show how a map showing part of the communities of Surrey and White Rock can be converted into street segments.

This architecture further supports different functionalities, particularly in that it is designed to interpret and consider geographic information from a requestor with a "real physical world" and "user" point of view; i.e.: a user on a street or physical place. It is designed to support and facilitate, but is not limited to, interfaces for mobile environments, such as Personal Digital Assistants (PDAs) or cellular phones. The system allows users to query the whereabouts of objects in a geographic setting and to query information about, through or otherwise associated with those objects.

A location referencing system is a system in which, given a named area, one or more street names, a landmark, or a proximity, or a combination of these, the system returns the geographic longitude and latitude of the described location or a collection of references representing street blocks within the given area. The database used by a preferred embodiment of such a location referencing system is described below. The process used may be implemented using a standard relational database management system and the terms: table; keys; SQL; and query are terms in the art to those with a working knowledge of such database management systems.

The database used for storing segment and group information can be implemented by one skilled in the art. A preferred embodiment of a database for street segments follows:

(1) geocnt (Geographic Country)

A table representing countries should be created. This is not essential to the system but is preferable for completeness of design.

The information to be stored for each country is preferably the country's name and the ISO 3166.1, 3166.2, and 3166.3 codes as applied by the International Standards Organization group. For example, a table named georteseg with the following fields can be created so that the cde fields (cdes are unique codes for identification purposes) are unique among the rows. All cde values must be the same length (i.e. padded with zero's if necessary). For example:

| FIELD | DESCRIPTION | EXAMPLE |
| --- | --- | --- |
| cde | ISO 3166.3 code 840 | |
| nme | ISO 3166. | United States |
| iso3166_1 | ISO 3166.1 code US | |
| iso3166_2 | ISO 3166.2 code USA | |
| iso3166_3 | ISO 3166.3 code 840 | |

(2) geodis (Geographic District)

A geodis is an abstraction of a geographic area akin to a state, province or territory. For example, the state of Oregon should be a geodis object. A geodis is owned by a country (or geocnt) and a geocnt can and usually does own multiple geodis objects (as countries have multiple states/provinces/territories). Therefore a one to many relationship exists between geocnt and geodis. geodis objects also have unique "cde" values which uniquely identify them among all other geodis objects—even across countries. The cde value preferably begins with the geodis's owning country's cde value. For example, if "840" is the cde value for the United States, then all geodis objects owned by the United States would have a cde value beginning with "840". This technique is referred to as embedded owner id (or cde) propagation and is used extensively in the system.

The portion of the cde value after the geocnt cde is called a local cde part. This part of the cde value is unique among all other geodis objects owned by the same geocnt. Hence, if Oregon's local cde part is "53", then there would be no other geodis objects with a local cde part of "53". Note also the entire cde value for the state would be "84053". The United States government has defined two digit codes that uniquely represent each state in the union. This code is called a "FIPS code" and is the value which should be used for the local cde part of a geodis cde (FIPS stands for Federal Information Procession Standard). The Canadian Government has also defined two digit codes which uniquely represent each province and territory, called the "Standard Geographic Classification Codes for Provinces".

A geodis table may have the following fields. The cde is unique and is used as a primary key:

| FIELD | DESCRIPTION | EXAMPLE |
| --- | --- | --- |
| cde | as described above | 84053 |
| nme | ISO 3166. | Washington State |
| abr | ISO 3166.1 code | WA |
| geodistyp | ISO 3166.2 code | state |
| geocntcde | ISO 3166.3 code | 840 |

(3) georteseg (Geographic Route Segment)

A georteseg is a term that applies to a single street segment and is the basic unit by which the system works. Streets are naturally divided into "blocks" which are treated as street segments. Each end of a georteseg has a longitude and latitude representing the starting point and a longitude and latitude representing the ending point. These points create a line which may not reflect the shape of the street but do reflect either where the end of the road intersects with another or comes to an end.

The information to be stored for each georteseg includes a cde which uniquely identifies the georteseg among all other georesegs; the name of the street segment (e.g.: Main); the type (e.g.: St or Ave); the prefixing directional (e.g.: N for N Main St) and the suffix directional (e.g.: SW for Main St SW); the longitude and latitude pairs for the starting and ending points of the segment; the address range starting number and ending numbers for both the left and right sides of the segment; and, the 5 digit zip codes or the Canadian postal FSA code for both the left and right side of the streets.

The base information for georesegs can be obtained from either the US Government Census Bureau or the Canadian Census Bureau or authorized affiliates. Other sources exist as well. Of the vendors that exist, most provide data at this segment or block level although various computer software applications may be required to extract the information required.

A preferred embodiment of the a georteseg record follows:

| Georteseg | |
| --- | --- |
| FIELD | DESCRIPTION |
| cde | an id uniquely identifying the georteseg |
| nme | the local legal street name |
| typ | standard abbreviation of the street type |
| dirpre | directional prefix (eg: N) |
| dirsuf | directional suffix (eg: SW) |
| adrlftbgn | address range beginning on left side |
| adrlftend | address range ending on left side |
| adrrhtbgn | address range beginning on right side |
| adrrhtend | address range ending on right side |
| pstcdeprelft | US 5 digit zip code or Canadian Postal FSA code for left side |
| pstcdesuflft | US 5 digit zip code or Canadian Postal FSA code for right side |
| geoplccdelft | 10 digit geoplc cde for left side |

-continued

| Georteseg | |
| --- | --- |
| FIELD | DESCRIPTION |
| geoplccderht | 10 digit geoplc cde for right side |
| geodiscdelft | 5 digit geodis cde for left side |
| geodiscderht | 5 digit geodis cde for right side |
| geolngbgn | geographic longitude of beginning point |
| geolatbgn | geographic latitude of beginning point |
| geolngend | geographic longitude of ending point |
| geolatend | geographic latitude of ending point |
| cls | road class code |

Figure 3:
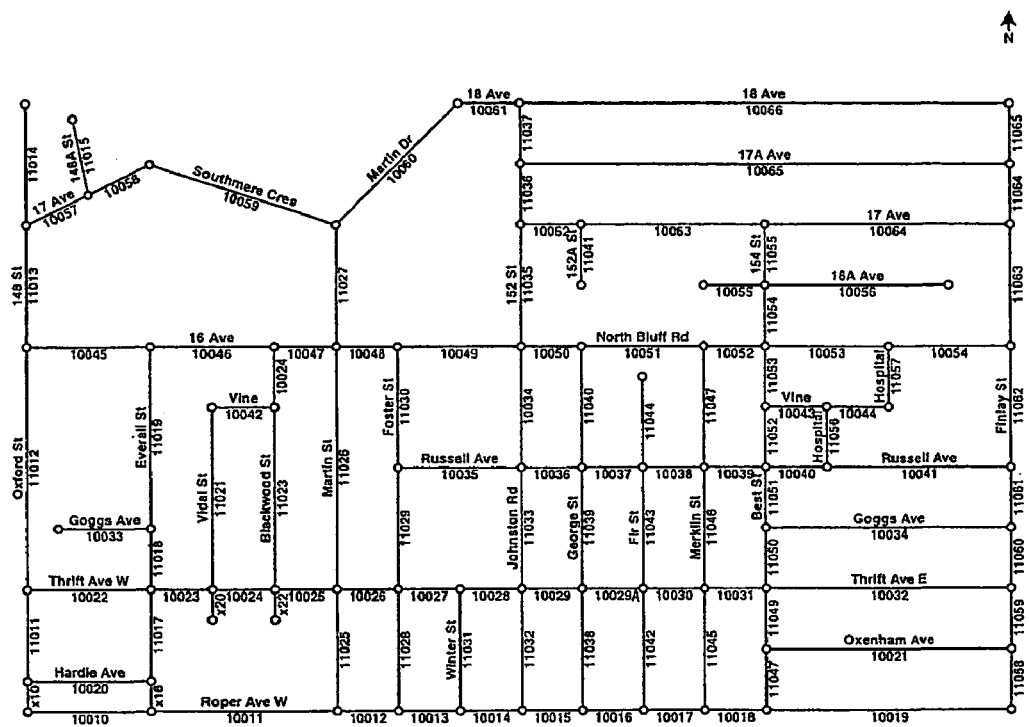
FIG. 3 is a graphical representation thereof showing the street segments with their unique identifiers.
Figure 4:
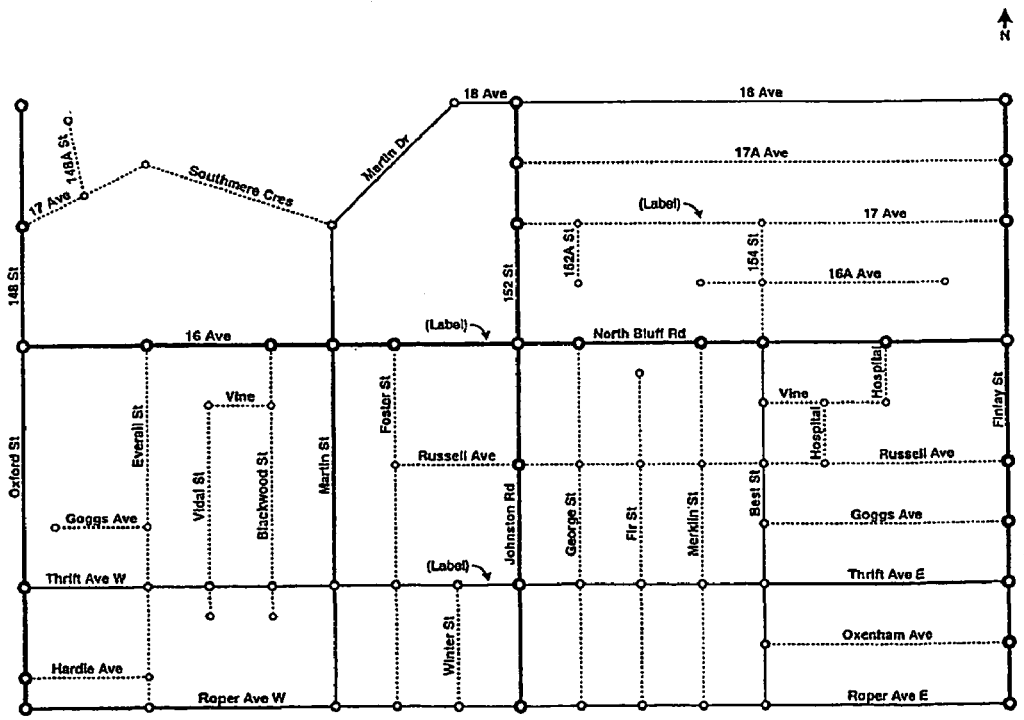
FIG. 4 is a graphical representation thereof showing the types of segments as highway, main or secondary roads.
Figure 5:
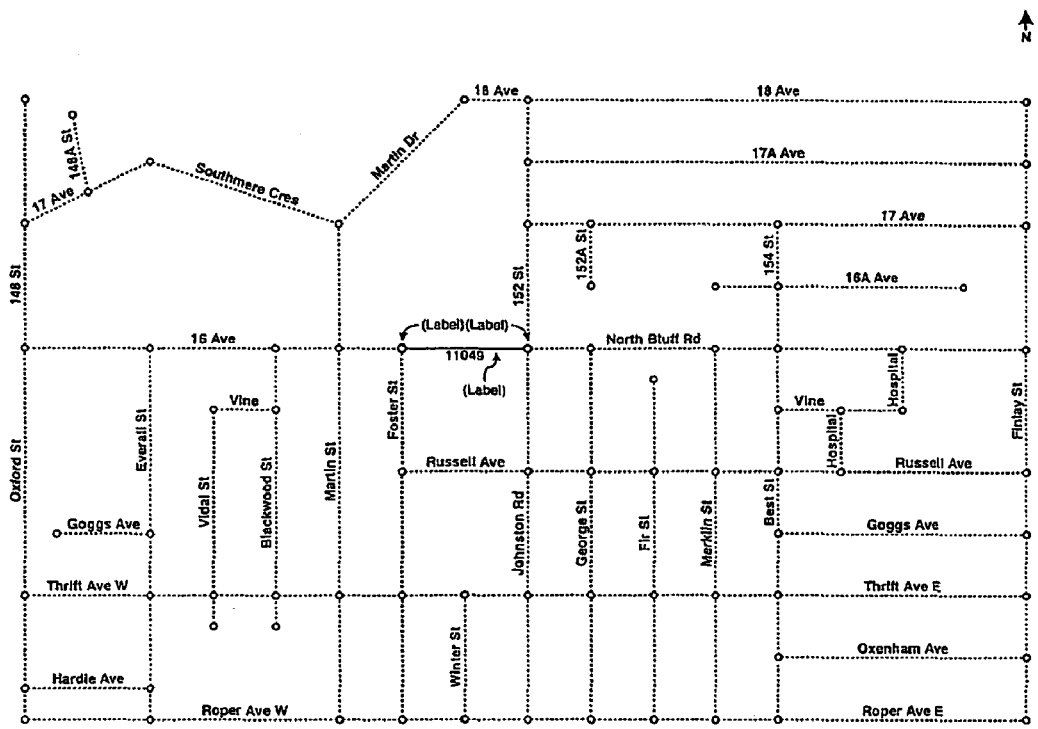
FIG. 5 is a graphical representation thereof showing a street segment and the endpoints thereof.
Figure 6:
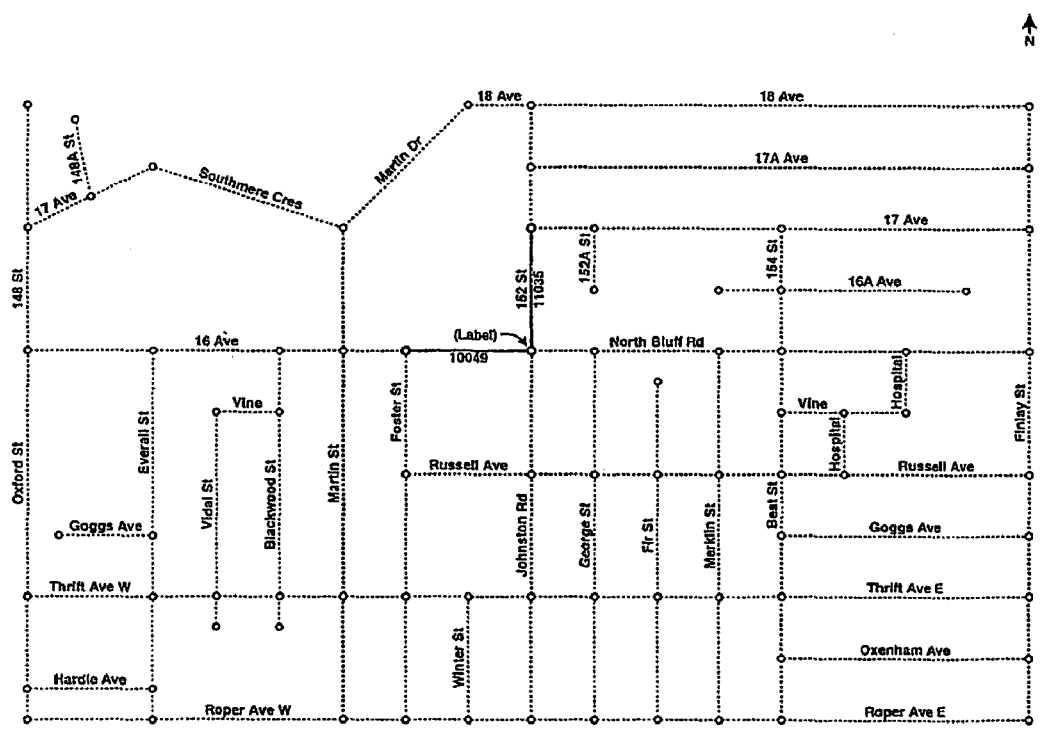
FIG. 6 is a graphical representation thereof showing the intersection point of two street segments.

Examples of segments with their cde codes are seen in FIG. 3. Fields may also be included that are useful to routing logistics, (such as segment speed limit and turn restrictions), or to enhance functionality for related portions of the system as well. Another useful street segment field relates to the type of street, secondary, major or highway, as seen in FIG. 4.

Each end of a segment either intersects with another segment or terminates. Segment intersections can be determined by evaluating which segment have common longitude and latitude coordinates between their beginning and ending points.

The street segments in a database for use with the invention may have to be harmonized or homogonized into a common form, or record type. The database table should contain the required fields for the segments and be populated with the table field values from the various sources. Street segments should be grouped (as described above) by state or province for best performance but this is not necessary with sufficient high end processing power on the computer platform being used to operate the system. The database table which houses the street segments is referred to in this document as "georteseg" (geographic route segment).

Longitude and latitude coordinates for a street segment can be based on a variety of datums. It is important that all street segments either share the same datum or use a datum identifier that is stored and related to the segments. Converting longitude and latitude coordinates to a common datum prior to storing the segments is the preferred process as subsequent transformations are not required which improves performance.

Groups

The system, according to the invention, uses the concept of grouping the segments into collections of segments representing various entities or purposes, called segment groups that represent various geographical entities or purposes. Examples of prominent groups may include those for spatial or geographical referencing and the application of business logic. The group names should follow a very precise naming convention in order to facilitate the organization and recognition of their attributes and allow the flexible encapsulation of group attributes in the name. Proper naming makes the overall system more adaptable as tables will not need to be structurally changed when enhancements or modifications are made only a new naming convention is required.

The following describes an embodiment of group organization, identification and structure. Those skilled in the art will be aware that there are many variations on such organization, naming and structure that may be employed to carry out the method and system according to the invention.

Figure 11:
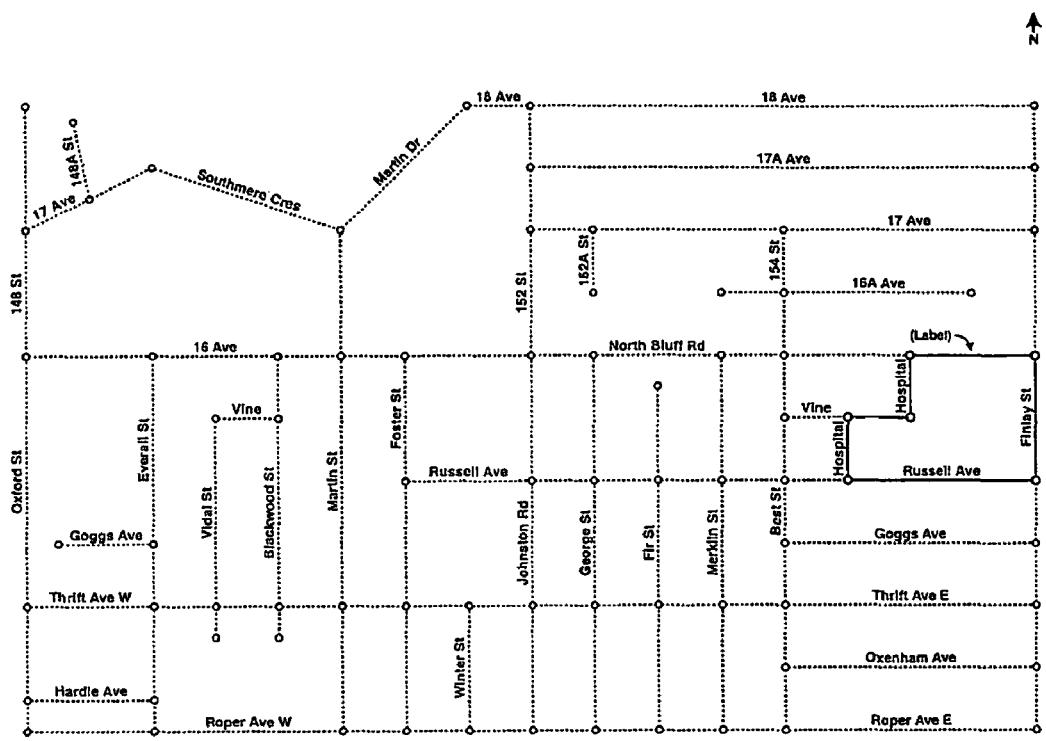
FIG. 11 is a graphical representation thereof showing a group of street segments associated with a point of interest.
Figure 12:
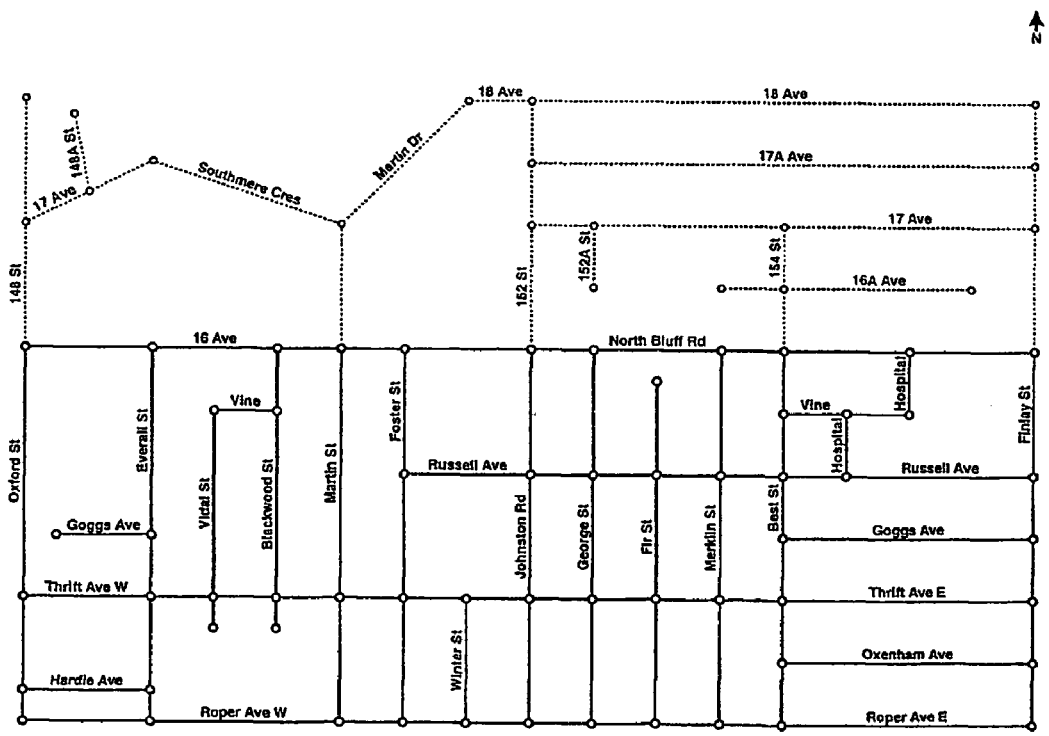
FIGS. 12 and 13 are graphical representations thereof showing a group of street segments associated with a municipalities.
Figure 13:
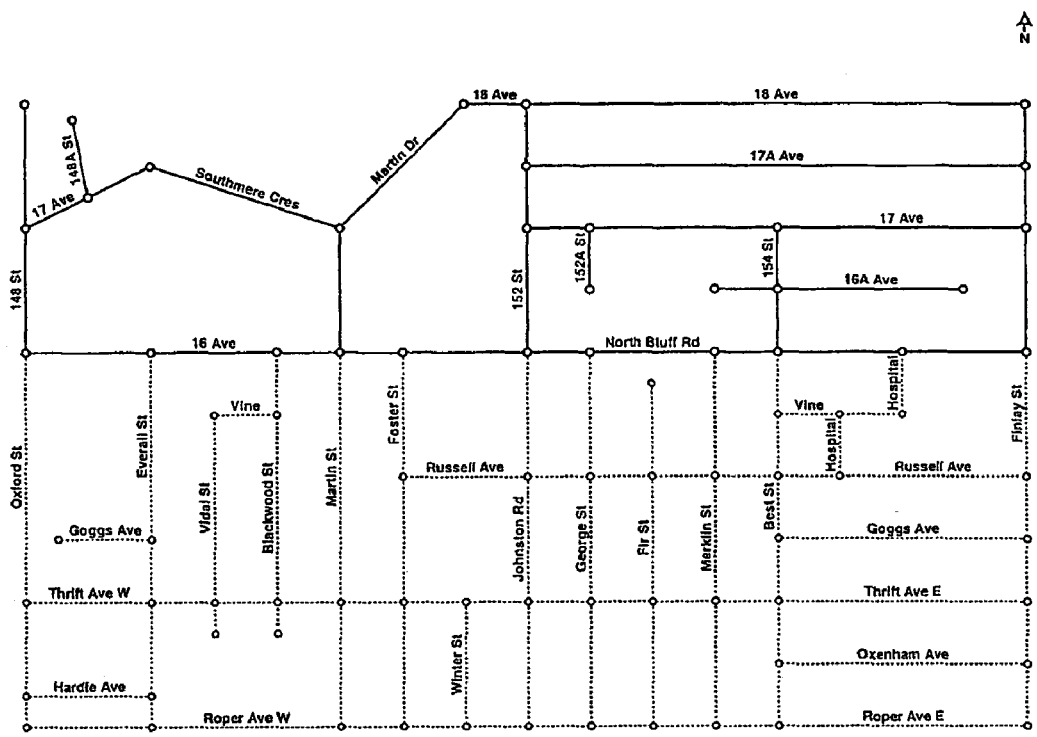
Figure 14:
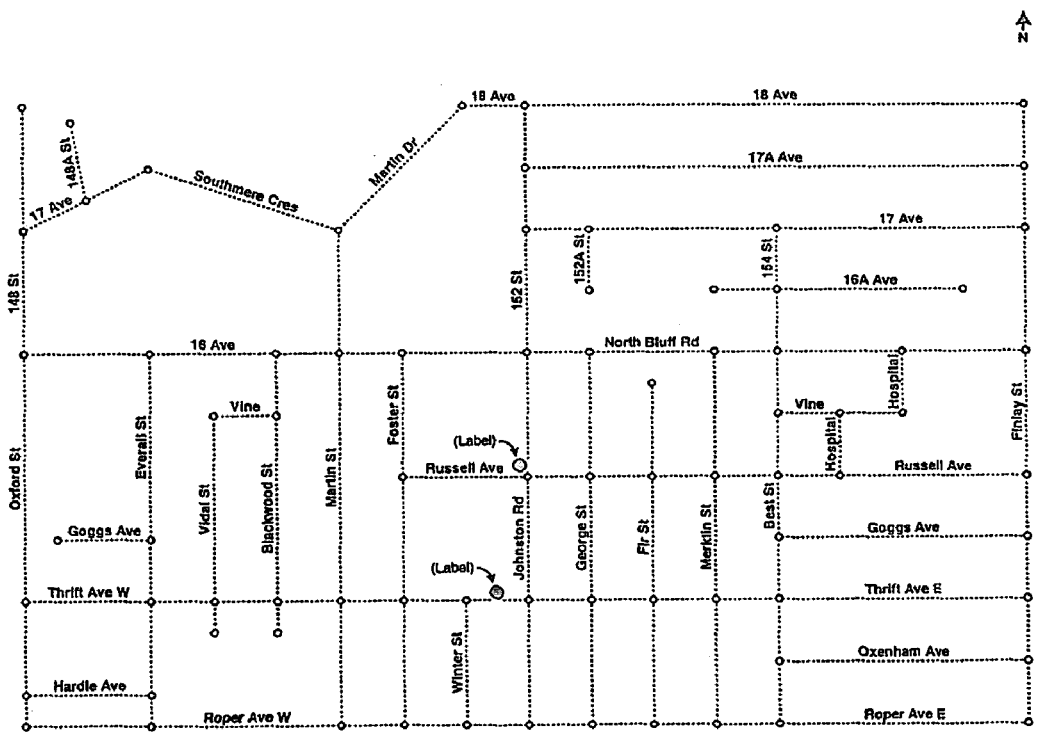
FIG. 14 is a graphical representation thereof showing two points of interest.
Figure 15:
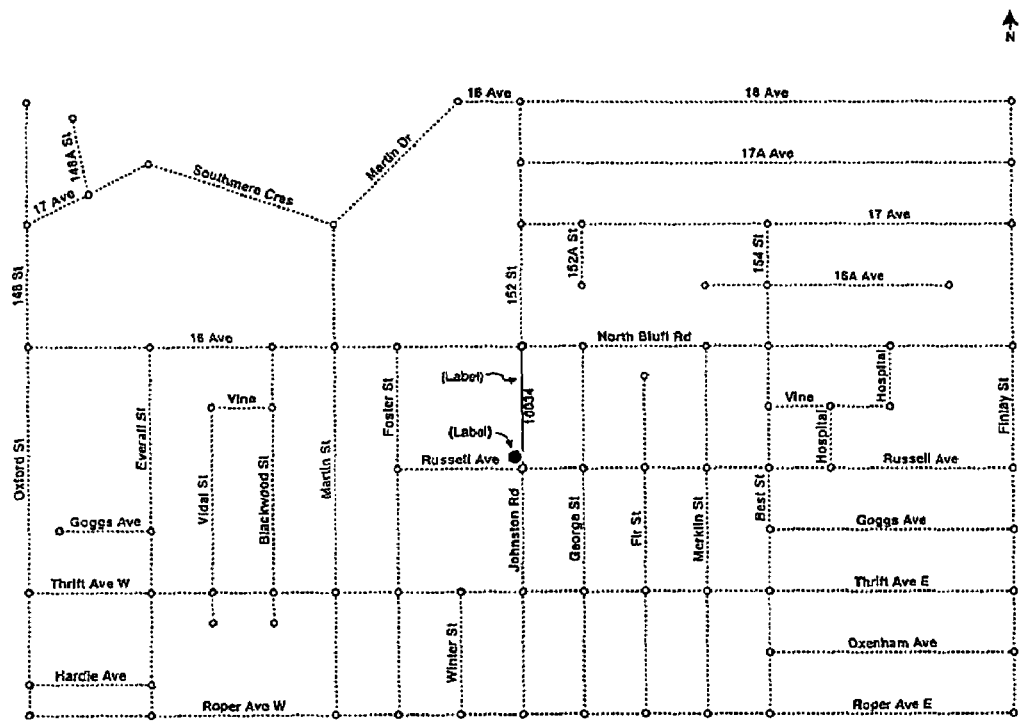
FIG. 15 is a graphical representation thereof showing a segment associated with a point of interest.
Figure 16:
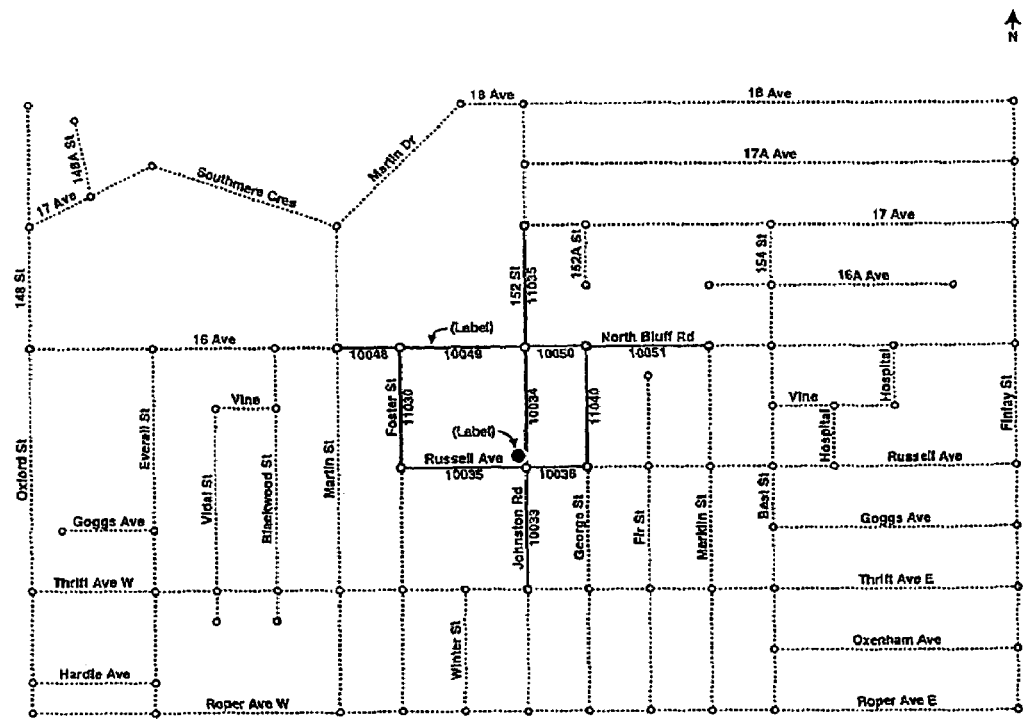
FIG. 16 is a graphical representation thereof showing a group of segments selected by an advertiser based at the point of interest.
Figure 17:
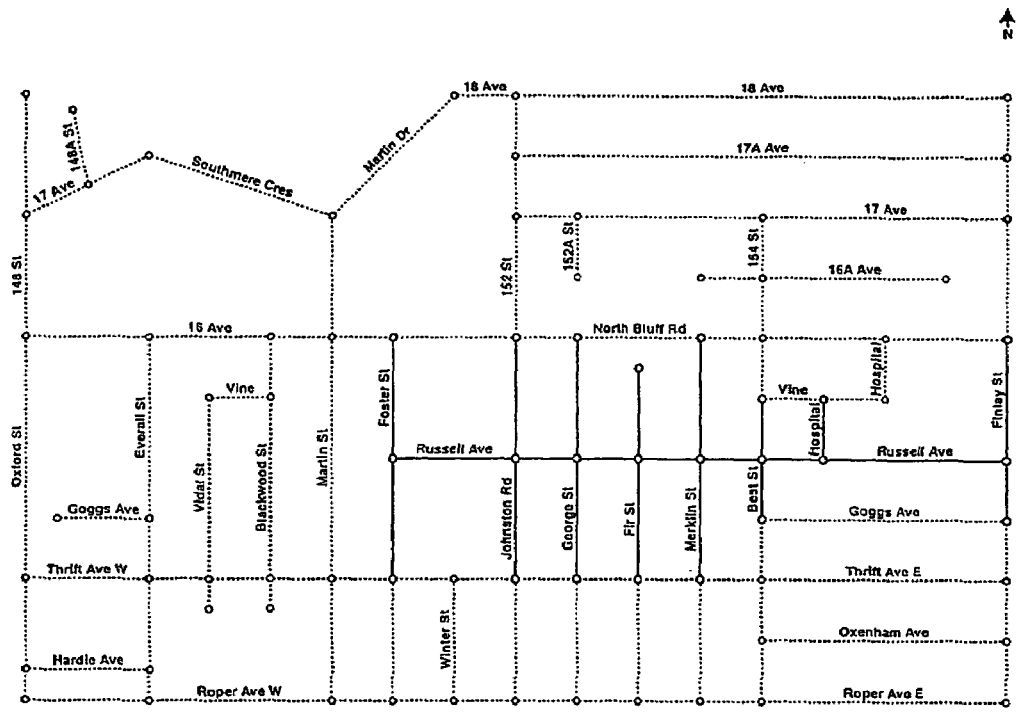
FIGS. 17 and 18 are graphical representations showing the segments within "one block of Russell Ave." and "within two blocks of Russell and Johnson", respectively.
Figure 18:
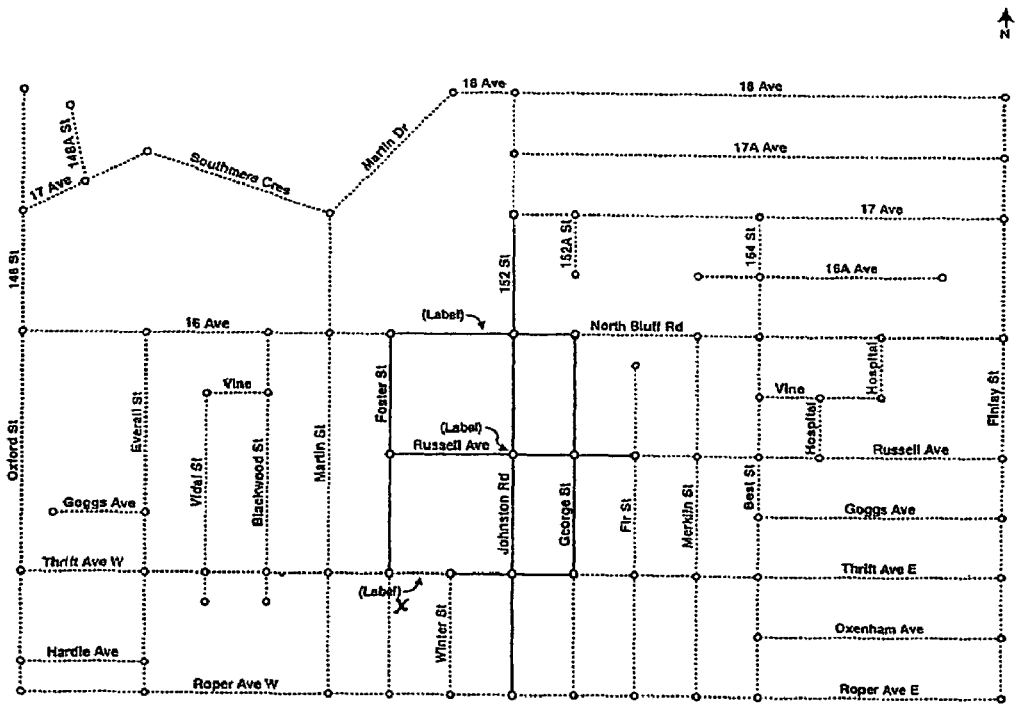
Figure 19:
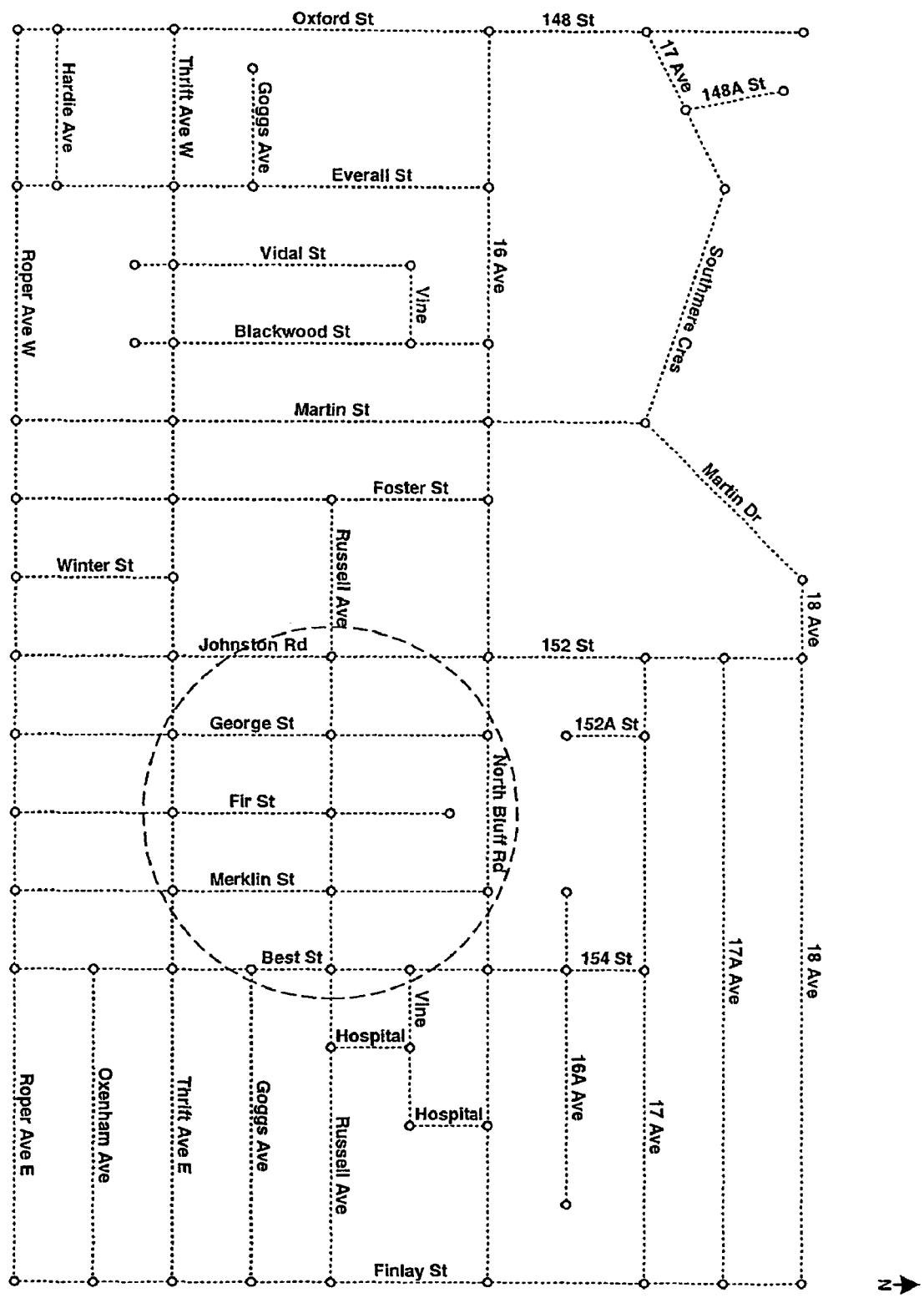
FIG. 19 is a graphical representation of a proximity radius centered at Russell and Fir.

An example of a group type is place groups (also referred to as geoplc). Place groups are groups that encompass places. Places can be any abstraction of the term: legal, unincorporated place, common or colloquial names (e.g. city areas), counties, city districts, entire states or provinces. Place can include personal definitions (e.g. a users area of regular travel), or business definitions (e.g. the area from which a business draws customers). The place groups define street segments (herein referred to as georteseg items) into collections. The name of the group encapsulates some information about the group. Examples of place groups are seen in FIG. 11 (the street segments s surrounding the Peace Arch District Hospital) and FIGS. 12 and 13 (the street segments in White Rock and Surrey, respectively).

Place groups are preferably created for common place names in each state or province. An example of a naming convention could be the following:
geoplc_common_cccdd_ppppppppp In this example, ccc represents the 3 digit ISO 3166.3 country code (eg: 840 for the US, 124 for Canada); dd represents the US State FIPS codes for the State or the Canadian Standard Geographic Classification Codes for Provinces as established by the Canadian Government (eg: 53 is the US FIPS code for Washington State, 59 is the Canadian Standard Geographic Classification Code for the province of British Columbia in Canada); and ppppppppp is unique serial number which uniquely identifies the group among all similarly named groups.

Groups also have a type. For example, all groups representing common places have a common group type. In the above example, it is "geoplc_common". For each group, another table stores the data for the group (herein referred to as grpdat).

Grpdat is populated with all of the georteseg segment ids pertinent to that group. Grpdat should contain the following fields in the table:

(a) a unique serial id;
(b) the group description code; and
(c) at least one georteseg segment id.

Each group should populate the grpdat table with as many segments as appropriate for that group.

Another group type is known as a street segment groups (or geortesegs). These groups represent collections of street segments by various parts of the street name. These follow the same group naming conventions as the place groups except that the "geoplc_common" field is exchanged for "georteseg_common". These georteseg groups are organized according to the following rule: for each state or province the distinct street segment names are selected which exist in that state or province; i.e. a list is derived of all of the names of streets in the state or province.

For each distinct name, groups should be created with variations should they exist. Some of these variations may include:

(a) Street Type—a list is derived of all of the types of a given street such as "Georgia St.", "Georgia Dr.", "Georgia Ave.", etc. For each of these groups a group is created for the top level group (such as "Georgia"); and (b) Street Directional (whether appearing as prefix or postfix notation—Georgia St W or East Georgia) a group is created.

Groups provide flexibility for the system and method. Place groups provide for arbitrary named places consisting of street segments. Street segment groups provide for various forms of interpretation and resolution. For example, if Georgia Street has 4 segments (i.e. 4 blocks) which are called West Georgia and 4 segments which are called East Georgia, the "Georgia" group would consist of all 8 segments and each of the respective directional groups consist of their respective 4 segments. Another useful type of group is that of street segments meeting at an intersection.

In essence and practice, the more specific the inputs the group has the more accurately the group can be searched. The groups facilitate more efficient lookup. For example, if there was a Georgia Avenue and a Georgia Street, the "Georgia" group will reference all of the segments of both the street and the avenue. If the street and avenue both have east and west components then the Georgia East group contains only the segments from both the street and avenue which are the east segments.

The system uses group segments to representing various entities, commonalities, or purposes. Examples of prominent groups may include for spatial or geographic referencing and/or the application of business logic. Groups may also reflect hierarchical relationship representing various entity relationships, or purpose relationships. Groups provide the benefit of enhancing table search performance. As a large number of segments are generally stored in the segment table, searches can become time and resource intensive from a system operation perspective. Groups can reduce the time necessary.

Depending on purpose of the group which could dictate different functionalities, certain group attributes may be more efficiently stored in the segment table and/or group tables. Examples of such properties include the city and/or province identifiers of segments. Groups also provide flexibility. In the place form, they provide for arbitrary named places consisting of street segments or other groups. In name form, they provide for various form of interpretation and resolution. For example if Thrift Avenue consists of seven segments identified as West Thrift Avenue and five segments identified as East Thrift Avenue, a group representing Thrift Avenue would refer to all twelve blocks of Thrift Avenue, another group would refer to the seven blocks of West Thrift Avenue, and a third group would refer to the five blocks of East Thrift Avenue. By specifying the segment name, segment directional prefix, segment directional suffix and segment type as properties of the groups, one can quickly find all of the segments which comprise Thrift Avenue, West Thrift Avenue and East Thrift Avenue. By searching group properties rather than the segments, in this example three elements were considered instead of 12, which provides improved performance.

One of the purposes of groups is to be able to, given a label, be able to efficiently obtain a list of the segments which apply to the label. Another consideration when creating groups is to allow cascading of group hierarchies from groups to groups contained within larger groups. One such example would be groups which point to sub groups such as countries groups which relate to state and or province groups which in turn relate to city groups.

Groups are also formed to take advantage of natural language patterns of requestor. Furthermore, group constructs facilitate searching by paths, radius or blocks. Furthermore the system can "complete" groups by adding segments where logically necessary. For example, in FIG. 18, a group is identified that represents "two blocks from the intersection of Russell and Johnson". Segment X intersects with two segments that form part of such group, but is itself, not included. The system can check for such "lost segments" by checking for segments that intersect at both their starting and ending points with the groups, and include such segments in the group.

Grammars

The process describes building voice recognition grammars and a method for converting utterances spoken by a user into location references. Location references represents groups. Groups represent sub segment groups or segments. Segment groups reflecting various segment constructs and related segments are defined. Prominent groups include cities, neighbourhoods, landmarks, and streets. Each group has a type, for example, city, neighbourhood, landmark, and street and optionally relationships to other groups.

Groups representing collections of segments by name, and optional neighbourhood, city and state or province, reference, are created. Segment class, e.g. secondary or primary or highway or other class, can be identified as an attribute of the group as well. In addition, attributes reflecting voice recognition instructions or text-to-speech or other presentation instructions can be identified with the group. This is particularly useful for handling special or multiple pronunciations and adjusting text-to-speech representations for accuracy.

Figure 7:
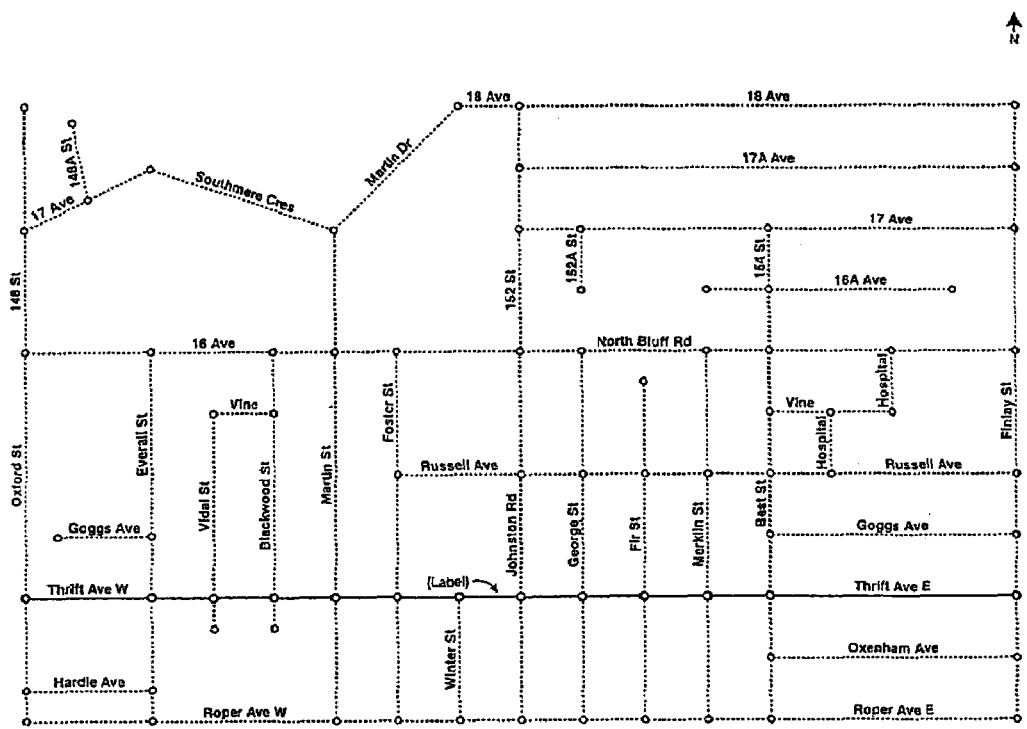
FIGS. 7, 8 and 9 are graphical representations thereof showing groups of street segments.
Figure 8:
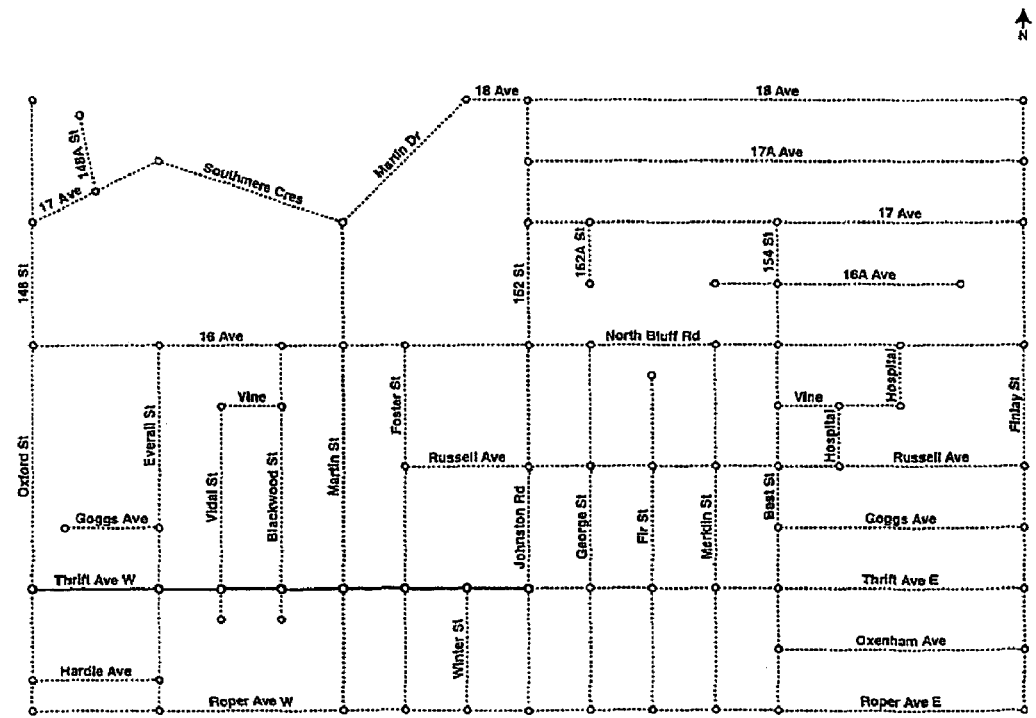
Figure 9:
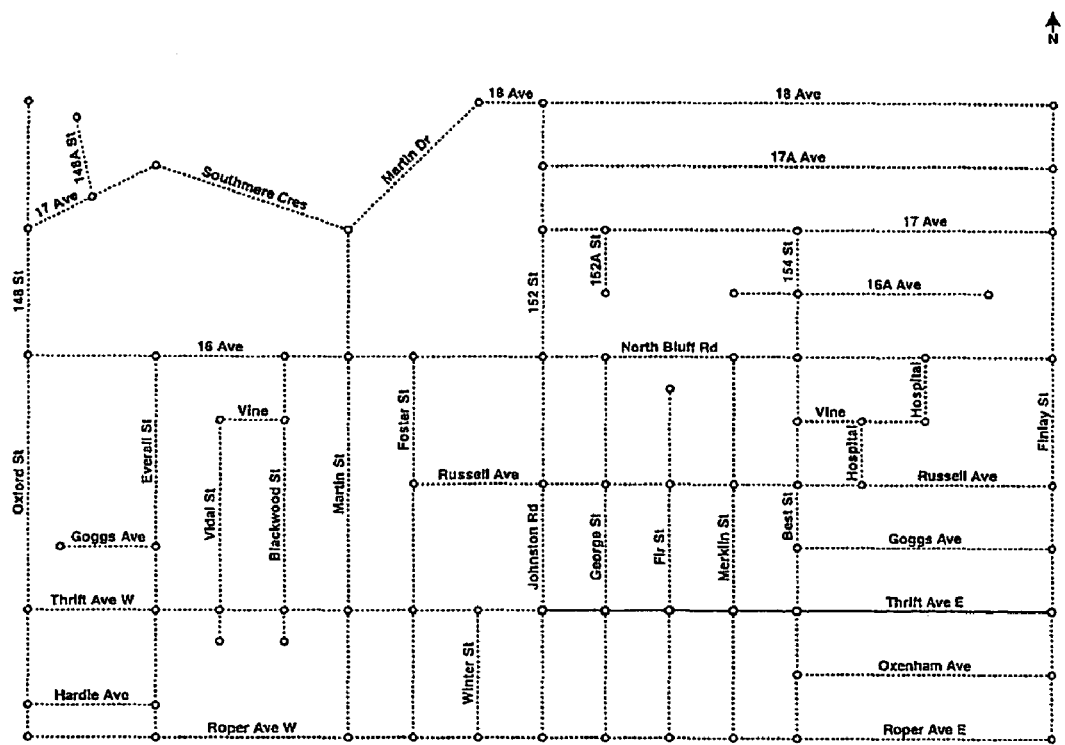
Figure 10:
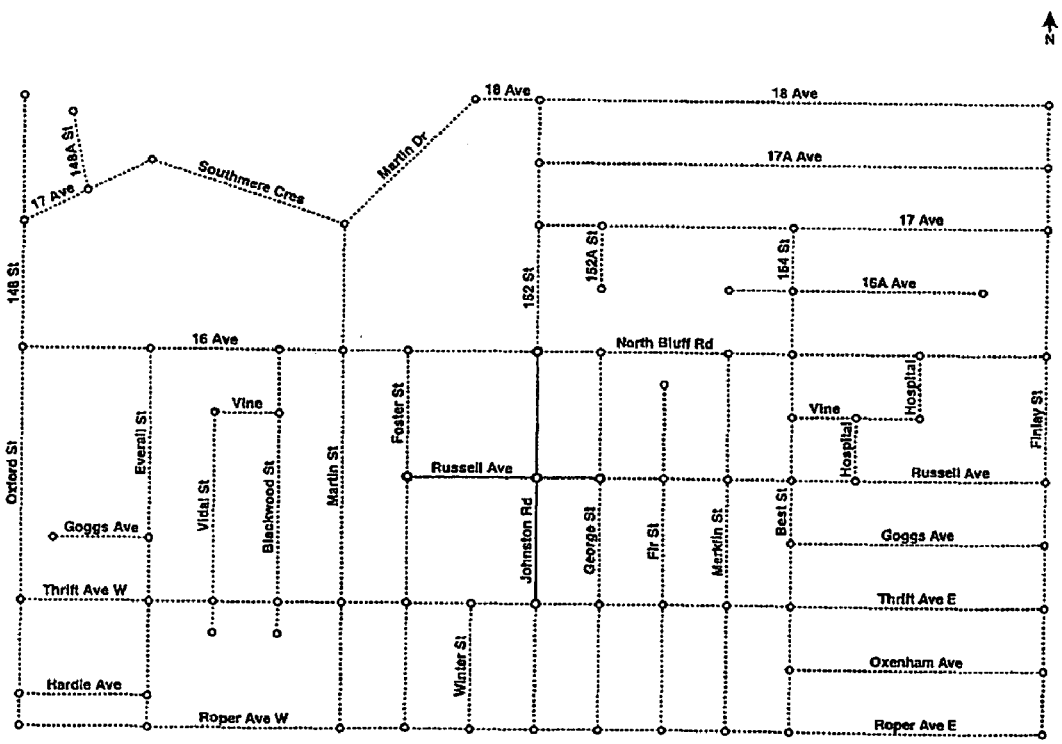
FIG. 10 is a graphical representation thereof showing a group of street segments associated with an intersection.

For example, as seen in FIGS. 7, 8 and 9, three groups for Thrift Avenue would be created each with applicable segments representing the notions of "Thrift Avenue West", "Thrift Avenue" and "Thrift Avenue East". The Thrift Avenue West group would have the name property of the group as "Thrift", the directional prefix as nothing, the directional suffix as "west" and the type as "Avenue" and be identified as being a collection of segments representing a street. Optionally, an owner attribute could indicate it is owned by the city of White Rock. The segments referenced in the group would be 10022, 10023, 10024, 10025, 10026, 10027, and 10028 given that Johnston Rd. divides Thrift into East and West portions. The "Thrift Avenue East" group would have the name property of the group as "Thrift", the directional prefix as nothing, the directional suffix as "east" and the type as "Avenue" and be identified as being a collection of segments representing a street. Optionally, an owner attribute could indicate it is owned by the city of White Rock. The segments referenced in the group would be 10029, 10029A, 10030, 10031, 10032.

The "Thrift Avenue" group would have the name property of the group as "Thrift", the directional prefixes as nothing and the type as "Avenue" and be identified as being a collection of segments representing a street. Optionally, an owner attribute could indicate it is owned by the city of White Rock. The segments referenced in the group would be 10022, 10023, 10024, 10025, 10026, 10027, 10028, 10029, 10029A, 10030, 10031, 10032.

Searching any of these groups with the name input as "Thrift" yields all groups and therefore all twelve segments represented by the groups. Searching any of these groups with the name input of "West Thrift" where "West" is in either the directional prefix or direction suffix and the name is "Thrift" will yield the single group with the name Thrift and the directional suffix as "West" representing seven segments. When applied and in practice, searching groups in this manner resolves what are referred to as common or non-legal expressions and reduces the number of items being search; instead of searching all segments in the table, the search is against fewer groups with attributes representing those segments. A group represents a form of segment based on criteria.

Grammars represent programming for use with voice recognition systems. That is to say voice recognition systems use grammars to define what spoken words or phrases, called utterances, are recognized. Grammars are preferably constructed to support natural language expressions. For example, "Thrift and Johnston", "Johnston and Thrift", "Thrift at Johnston", "West Thrift", "Thrift West", "West Thrift Avenue", "Thrift Avenue West", "Thrift between Martin and Johnston" should all be understood by the grammar. Grammars are constructed to support numbered streets in the form of digits, (i.e.: one-seven) as well as cardinal and ordinal forms (i.e.: 17 and 17th) reflecting the three ways numbered street names can be spoken (one seven; seventeen; seventeenth).

The grammar may apply street/road class and assign probabilities to utterances which is preferred as this increases voice recognition accuracy in most situations. The reasoning is that more prominent streets have a higher likelihood of being named compared to similar sounding names of representing a less busy street class/type.

Grammars are constructed such that the placement of certain phrases or words assist interpretation. These words include but are not limited to "at", "and", "near", "between", "within", "of", "the", "on". The grammars are optionally further constructed to support object names, distances in units for proximity, neighbourhood names, city names and state/province names.

The grammar is preferably constructed to assign values to slots and return names and values for slots where the values are portions of the utterance. For each street to be recognized, the following slots are used: [direction prefix n], [name n], [direction suffix n], [type n] where n is the instance number of a street utterance. Additional slots include, but are not limited to, [object] and [object param n], [proximity unit], [proximity metrix].

In general practice, when the user is not supplying streets specifying a user path or route, the following rules, while not strict, can be used: If 1 [name n] slot is returned, the user has indicated a single street. If 2 [name n] slots are returned, the user has indicated an intersection. If 3 [name n] slots are returned, the user has indicated a portion of a street isolated by two cross streets. If the user has indicated 4 [name n] slots the user has indicated either 2 intersections or 4 streets which can be investigated to determine if an area enclosed by the said streets exists.

Slot values are matched with group attributes. The more slot values available (expressed by the user) the less ambiguous the reference is. For example, if only a [name n] slot is available, only the name attributes of the street groups can be searched. If a [direction prefix] or [direction suffix] was provided in addition to a [name], then those group attributes can be search as well. It is important to note that when constructing grammars if only one directional is specified in the group attributes, that directional can take place in spoken language prefix or suffix form. For example, "West Thrift" and "Thrift West" are valid expressions. Thus, when searching groups with directional attributes, if a single directional was supplied, it should be searched for in both the prefix and suffix locations regardless of whether it appears as a prefix or suffix form from the grammar slot. This does not apply when no directionals are provided or where two directionals are provided. In the case of two directionals, natural language expression does not support transposing of the directions; i.e. "North 1st Avenue West" cannot be properly expressed as "West 1st Avenue North".

Points of Interest

The system allows users to locate and/or become aware of and/or interact with content and/or objects or there properties of same, herein called Points of Interest ("POI"), based on a combination location criteria, herein called Location References ("LR"), and optionally other attributes of the object. Points of Interest are "bound" to street segments, i.e. Points of Interest have a direct relationship to specific street segments or groups representing collections of street segments. Examples of Points of Interest include restaurants, movie theatres, gas stations, landmarks, etc. The Points of Interest for a particular information request will depend on the nature of the request and the Location Reference.

The system supports a variety of Location Determination Technologies (LDT) to obtain Location References. Location References may express points (such as a geographic longitude and latitude coordinates), street names, intersections, landmarks, bridges, tunnels and other features, areas, towns, townships, and places.

The system defines the location of an object in three key forms: (1) by association with a particular segment id; (2) a value representing a percentage of the segment where the address of the object is located relative to the address range, and (3) the longitude and latitude of the object. Additionally, the side of the street may be used as well. To determine the correct segment, various attributes of the input location are compared with attributes of segments.

The system defines the location of an object fundamentally by associating an object with segment ids and/or a geographic longitude and latitude coordinate. Any object which has a physical real-world relationship to one or more segments, such as a business location, is always defined in terms of the relationship with one or more segments. A segment relationship in minimally expressed by segment id, but may include a value representing a percentage of the segment where the address of the object is located relative to the address range. Additionally, the side of the street or surrounding segments may be used as well.

For fixed objects with relationship to segments, objects have an address segment which is the segment which is representative of bearing the address of the object. To determine the address segment, the civic address is compared against segments with matching segment name, segment directional prefix, segment directional suffix, segment type, address left begin, address left end, address right being, address right end, post code. If successful, a signal segment assigned to a place group will result.

An important process which applies throughout the system, especially in voice, is transposing directions to reflect different forms of location expression. For example: West Georgia Street, where [dir]=west, Georgia=[nme], and [typ]=Street can be expressed as [dir] [nme] [type] (West Georgia Street) or [dir] [name] (West Georgia) or [nme] [typ] [dir] (Georgia Street West). Other combinations of [typ] and [dir] exist and are evaluated.

Once an address segment has been calculated, a value representing a percentage of the segment where the address of the object is located relative to the address range on the proper side of the street is calculated. For example, if the segment reflects the address range of 1 to 99 on the left, and 2 to 98 on the right, the address of 50 would be mathematically 50% from the end of the segment and on the right side. Once a percentage of the overall distance of the segment has been achieved, an longitude and latitude position can be determined. Accuracy can improve if segment shape tables are referred to in the process but this is not required.

Location Referencing

A Location References is information used by the system to obtain a geographical area related to the requestor's location or to the information provided to the requestor. It includes information that may be used by itself or in conjunction with other information and/or processes to determine a location such as postal codes and Telephone Calling Line-ID. Typically, through the system, Location References are processed to determine a location by which street segments the location represents.

Location Determination Technologies are processes that determine or otherwise indicate the location, to varying degrees of resolution and accuracy, the location of an entity or area. Location Determination Technologies are generally divided into two groups: automatic (Automatic Location Identification or ALI) and non-automatic. Automatic Location Identification (ALI) technologies provide location determination without the need for manual intervention in the process. Common examples of known ALI technologies include Global Positioning Systems (GPS) devices, cellular network cell identification (Cell ID) or cell of origin (COO), and wireless packet computation techniques such as Time Difference on Arrival (TDOA); or Angle of Arrival (AOA). These forms of ALI generally output geographic longitude and latitude coordinates. ALI can also be facilitated by common information entities. Telephone Calling Line ID (CLID; Caller-ID) and Automatic Number Identification (ANI) are examples of information that can and are often used to automatically determine location. Some forms of ALI or ALI supporting information services require and/or offer the ability for a user to control the relaying of location information or information that can be used to determine locations. An example of such a control is Caller-ID Blocking, a service provided by some telephone companies that allows the subscriber to "block" their Caller-ID from being provided to the callee.

The system and method according to the invention generally uses non-automatic Location Determination Technologies, particularly having the requestor identify a location via voice.

EXAMPLE #1

Determining Caller Location

In one embodiment of the system and method geographical information is obtained as follows:

1. A purpose of the system and method is to provide information, products or services to the requestor from a geographical perspective based on the requestor vocally providing either place names (city, state, landmark, etc) and/or street names.
2. When a call is received on the platform (the call handling device), for example by phone (land line or cellular), internet, or hand-held computer (PDA), the caller id and called number information is saved (named callerid and calledid respectively in this example).
3. Optionally, a lookup is performed on the database of members eligible to use the system to determine if the caller id matches that of a member. If so, member preferences are loaded which may include default services, and a province and city.
4. If a member profile is not obtained then a database lookup takes place attempting to identify the location of the caller by area code and prefix. If a confident match is found these become the default city and province or state.
5. The city and state may be solicited from the caller depending on the confidence of the information from the database lookups. For example, if the city and state cannot be identified, then the caller is asked by the system "Say the name of the city and state you're interested in" if the area code is US. If the area code is Canadian then the caller is asked "Say the name of the city and province you're interested in". If a database issue (i.e. an error) precluded any kind of identification, the system asks "Say the name of a city and state and province." If only the default state or province is determined, the system asks "Say the name of a city your interested in".

6. The system then asks "What would you like to find?". The system uses a grammar that listens for keywords from the requestor that are added to the system on an ongoing basis. For example, descriptive terms like "gas stations" or trademarks like "Starbucks" are examples of keywords that may be listened for. These keywords are internally referenced as "objects" and are represented in the grammar as the "obj" slot and are used to determine the Points of Interest. Other objects may refer the caller to outside parties, e.g. taxis or other service providers in the area of interest.

7. The system continues on to ask the requestor the name of a street or intersection. The grammar listens for street names, types and pre and post directionals (e.g. North Main St). These four inputs apply to all streets—name, type, prefixing directional and suffixing directional. All of these are optional inputs but the grammar is designed to always build the name of the street first—e.g. saying simply North would mean North as a street and not a directional. These elements are used to create the georteseg slot. The system listens for words such as "near", "and" and "at" which assists the system to determine if is two street descriptions were provided. The system also listens for proximity (stored as a geoprx value) (eg: 1 mile, 2 kilometres, 3 blocks) and an objprm description.

8. In the event of one georteseg description being incomplete, the system looks through the database for the best or exact match. This may include transposition of pre and post directionals thereby allowing the caller to refer to "Hastings West" as "West Hastings". All matching street segments are then extracted to a candidate list.

9. If two or more street segments were provided, the same process occurs a second time. This matching process extracts only the segments within the previously defined city (by speech or by default preference).

10. If the system is given two street names, then the system will ask for a radius: example "How far around you would you like to search?" unless this preference is described as a default in the system for the recognized requestor. The system first looks through all of the segments of the first street against the segments of the second street looking for a point of intersecting longitude and latitudes. Once a common longitude and latitude point are determined, the intersection is deemed valid and all of the segments in the database whose longitude or latitude for the end point or starting point are within the solicited proximity of the determined point are extracted to form the candidate list of street segments. Distances (such as miles, and kilometres) are converted in latitude and longitude for calculating which segments are appropriate for the candidate list. If the requestor expresses a distance in "blocks", the appropriate number of segments are counted out from the intersection.

11. All entities in the database of the specified object type associated with any of the candidate segments are placed in an entity candidate list and are considered Points of Interest.

Geo spatial positioning is a common process by which a group of satellites signal receivers that compute a longitude and latitude as applied to the Earth's surface. The system according to the invention can use a process by which this same and other related information is computed by more common information, such as street names, landmarks, and geographic areas (legal names or otherwise).

The system's smallest unit of information, street segments, are grouped together in ways which reflect relationships with each other in various forms. Particulars about each street segment and these groups allow for the process of geo spatial referencing—the ability to identify a specific location as a longitude or latitude or an area by these group associations.

EXAMPLE #2

Use of an Embodiment of the System by an Information Requestor (1) The system answers the phone.
(2) If the requestor is a registered user and the system was able to determine this from the caller id, then the requestor's profile is used through the process.
(3) If the caller id did not reflect a specific user profile, the area code and telephone number prefix are used to determine the best guess of the requestor's geographic area
(4) The system introduces itself with an audio logo and other speech.
(5) If the requestor's profile does not reflect a default location, the system asks the requestor to say the name of a city. Different versions of the grammar used to recognize places are implemented depending on the area code. For example, if the area code is "604". and the caller says "Vancouver", then "British Columbia" is asserted as the default province by the grammar because it is implied by the requestor's caller id. If the caller id reflected "206" and the requestor said "Vancouver", the implied state would be "Washington".

System: "Say the name of the city your interested in".
The requestor's response is placed in the geoplc slot.

(6) Depending on the requestor profile if one exists, a particular "service" may be asserted by the system. In the event of no such default service, the system asks: "What would you like to find?"
The requestor responds stating the kind of entity they would like to find. For example, the requestor may state "gas stations" or "accommodations" or "nearest gas station" or "nearest accommodations". The direct object is placed in the obj slot and the descriptor is placed in the objparam slot. The system also listens for a geoplc slot value (a place name) and will return the value if such a place name is provided by the requestor.

(7) The system then asks the requestor for a street name or intersection: "Say the name of a street or intersection".
The system listens for a street or intersection name. An intersection is simply two street names instead of one. For each street the system determines the street segments with the given name and places them into separate candidate lists.
If two street descriptions were provided, the two lists are evaluated to determine where the streets intersect. This is accomplished by matching segment longitudes and latitudes for the first given street with those of the second. If a match is located, the resulting longitude and latitude is saved. If the streets do not intersect an error message is given to the requestor and the question repeated.
If one street description was given, the candidate list of the segments with that street name is placed into the "target list".

(8) If the user provided two streets, the system asks the proximity to search. System: "Within what proximity?" The requestor responds with a proximity (eg: 2 blocks, 5 miles, 10 kilometers). The system then determines the street segments within the proximity of the intersection longitude and latitude. These segments are saved as the "target list".

(9) Having a defined list of target segments (the target list) which is a list of street segments derived from either one or two given street names, the system proceeds to lookup object entities which are coded as being on the candidate segment list (i.e. the obj slot as applied to georteseg slots).

(10) Depending on the object entity (object slot), one of several actions takes place. For example, if the caller said "nearest" or "nearest" is the default object parameter (obj-param) for the given object (obj), then the system evaluates the nearest object. If the objaparam for the object is "cheapest" then the system evaluates the lowest priced object that is coded to one of the candidate segments.

(11) An advertisement is preferably played to the requestor depending on caller profile and advertisement bookings.

(12) The object with the given object parameter coded as being located on one of the segments in the target list is returned to the requestor.

For example, the system: "The best reported price is 64.9 at Esso on Hastings near Main" or "The closest Starbucks is on Granville near 12$^{th}$" or "The closest available accommodations are at Days Inn on Hastings near Howe".

(13) The system then asks the requestor if the requestor would like to be connected with the object if the object has been flagged as being able to receive calls. The system: "Would you like to connect with them now?" If the caller responds "yes" the call is patched through.

If the connection cannot be established or when the connection terminates on the called party side but remains on the requestor side, the system continues.

(14) The process returns to step 6 until terminated by the requestor.

Collecting Information

The system and method can also be used to collect information from callers, as shown in the following example.

EXAMPLE #3

A Caller Providing Information about Gas Prices to the System (1) The caller says "gas tip" or another trigger word relevant to gas prices to the system.

(2) The system then asks for the name of an intersection,

| System: | Say the name of an intersection |
|---|---|
| Caller Example: | Main and 1st |

(3) For each of the two streets named, the system retrieves the street segments from the database. It then looks for a longitude and latitude point shared in common with both street segment groups. This common point is called the reference point. All street segments sharing this point are placed a candidate list.

For example:

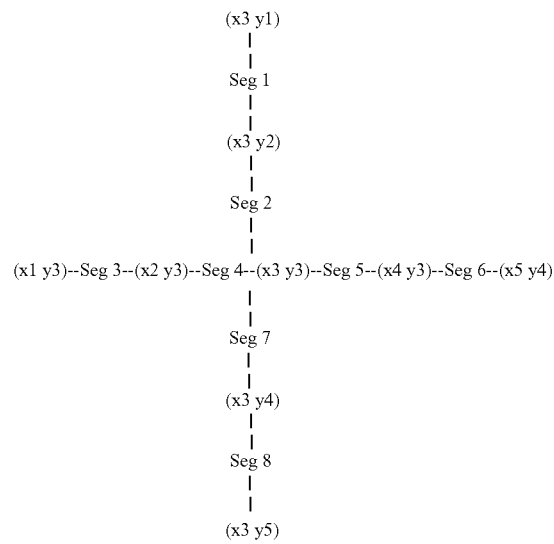

Assuming that the horizontal group of segments is named "Main" and the vertical group of segments is named "1st"; if the caller said "Main and 1st" or "Main at 1st", segments 2, 4, 5 and 7 would be returned because these segments share the common point x3 y3.

(4) The gas stations which are coded to be positioned on any of the candidate segments are then placed into the gas station candidate list. There may be zero or more candidates (zero being no gas station referenced at that location).

(5) If there is more than one gas station in the gas station candidate list, the gas stations brands are given to the caller and the caller is prompted to repeat the brand back:

For example:
System: Which gas station near main and first? Repeat the brand name of the gas station you are reporting a price for: Exxon, B P Petroleum
Caller Ex.: Exxon The system eliminates the non-named brands from the gas station candidate list leaving only one.

(6) With the gas station candidate list now containing one gas station, the system asks for the fuel type:
System: Say the type of fuel you are reporting a price for: Regular, Mid Grade, Premium, Propane or Natural Gas
Caller Ex.: Regular (7) The system then requests the price which can be provided via voice input or by way of touch tone entry.
System: Say the price. For example sixty nine point five or a dollar forty-seven and 7 tenths.
Caller: Fifty Six point Nine (8) If the fuel type is gasoline and not propane or natural gas, and the state allows self-serve, the system asks for the delivery form of the price:
System: Is this a self-serve or full-serve price. Say "self serve" or "full serve".
System (Alternative)t: Is this a self-serve price? Say yes or no.
Caller Ex: Self-Serve
Caller Alternative Ex: Yes If there is no candidate gas station listed, and the caller's profile indicates that that caller is permitted to create a new gas station in the system, then the system will ask for the brand:

System: We don't have a gas station listed in that location. Say the name of the gas station brand located there: Exxon, B P Petroleum, Unocal, etc.

Caller: Exxon

Alternatively, the system may direct the call to an operator if the caller's profile indicates that operator assistance is required when providing the location of a new gas station. The call is connected to an operator and the given data provided to the operator's console via normal screen pop.

(9) If the caller's profile permits auto-entry of the gas station and price into the system and a new gas station location is being provided, the database is updated with the brand and street segments (all relevant segments as the real segment is not known) and the gas station is also flagged as being new. The newly created gas station's id is placed into the candidate gas station list.

(10) The database price table is updated with the provided price, fuel type (regular gas, propane, etc.) and delivery method (self/full serve).

(11) The caller is thanked for the tip.

The system can also be used to allow users to provide their own groups, for example their frequently travelled routes to and from work. To accomplish this, the user contacts the system (for example, by phone), provides a starting point and end point, and lists the streets travelled from the starting point to the end point. The system can create the group based on the intersections between such streets. For example the system will being the group formation by creating a group of the first street named. Once a second street is named, the system will truncate the first street group at the intersection point, and add the new street segments to the group (also truncated at the intersection point). If an intersection cannot be found (i.e. there is a gap between segments), the system may request further information or may complete the group based on the information provided using a routing routine.

Targeting Information and Advertising

Geographically targeted information is a process which relates content, called information content, with content classes, geographic locations, scheduling, time and impression counts. The information content may be any form of content, for example, an internet URL, an audio advertisement, video, a command to a machine, etc. The method and system include a method which coordinates the dissemination of multiple geographically targeted information content in such a fashion as to satisfy each geographically targeted information instance's attributes in a prioritized fashion.

The process can be applied to any form of information for which dissemination should be controlled by one or more of: content class, geographic location, time and impression counts. Uses include, but are not limited to, providing advertising and promotions, messaging, traffic reporting, and notification services.

The basic unit of information content, called a beacon, associates the information content with a schedule and a dissemination count. A schedule identifies the periods of time for which a beacon is active and therefore, based on the criteria of time, when the beacon is a candidate for the dissemination of it's information content. The dissemination count identifies the maximum number of disseminations of the information content to take place.

Figure 20:
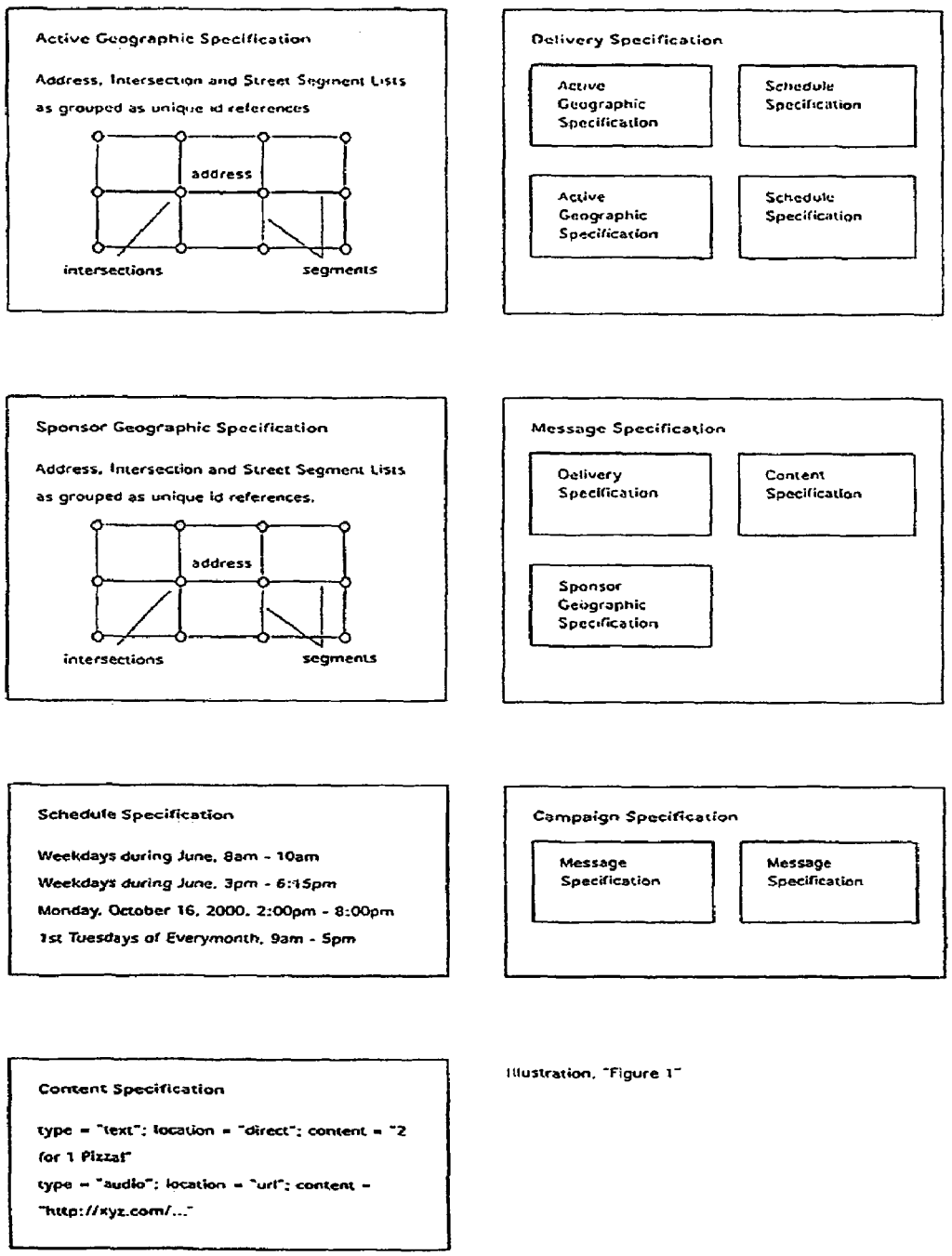
FIG. 20 is a graphical representation of beacon specifications.
Figure 21:
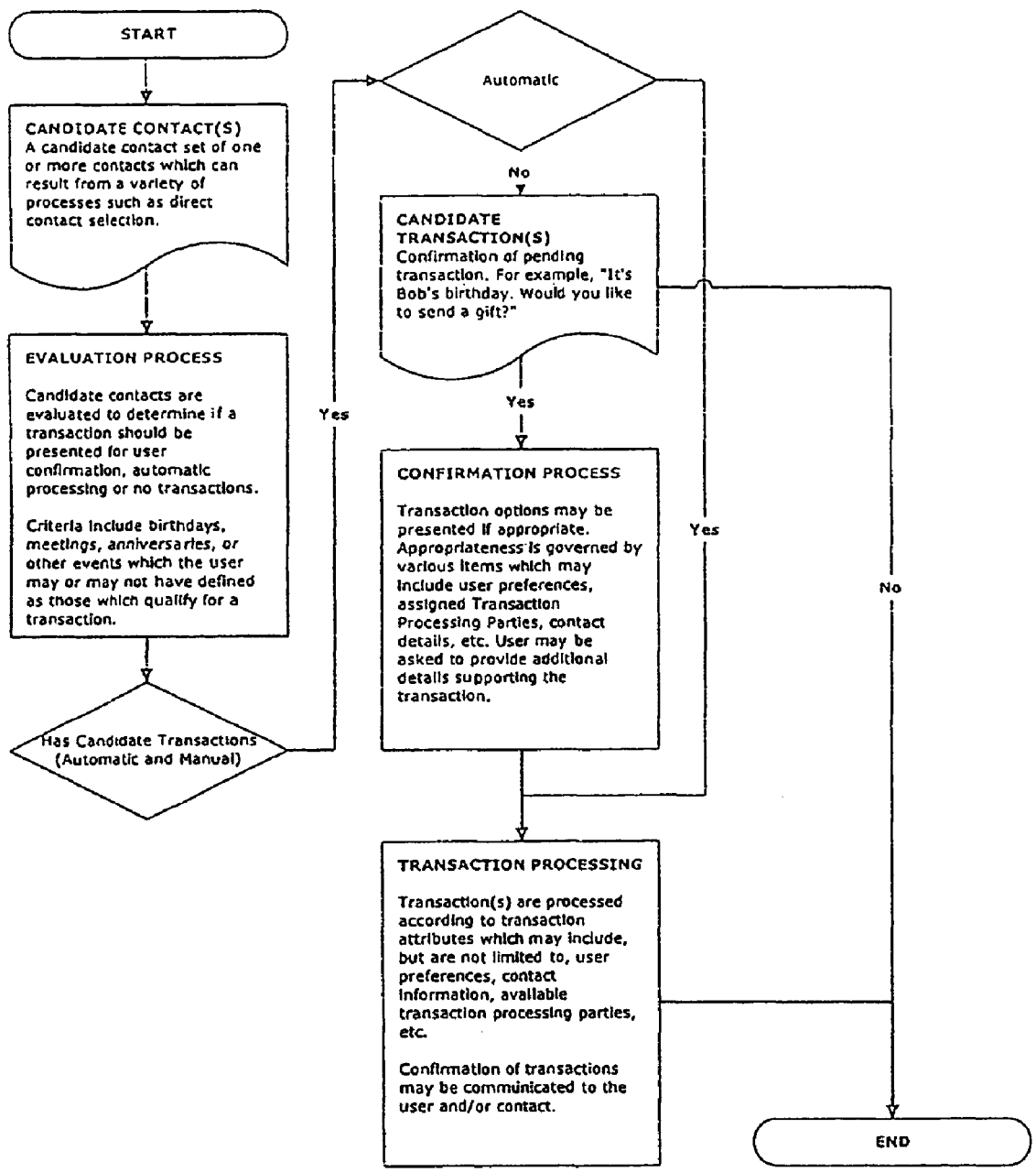
FIG. 21 is a flow chart showing the processing of a transaction from information in a PIM.

A campaign associates one or more geographic locations and one or more content classes with one or more beacons. While the geographic locations and content classes properties could be properties of a beacon instead of a campaign, abstracting them to a campaign and allowing beacons to share common content classes and geographic locations improves the overall robustness of the system in terms of resources, flexibility, and administration models and provides the functionality to more directly to support some existing real-world advertising models (i.e. as available on radio). Geographic locations preferably represent a group of street segments, which may be defined by the advertiser. Content classes facilitate grouping of related content. Each beacon as applied to a specific campaign may include a weight relative to other beacons also associated with the same campaign. The application of weight allows beacons to have disparate priority and probability of disseminating their information content relative to other beacons in the same campaign. FIG. 20 displays a graphical representation of advertisement specifications.

An owner represents one or more campaigns. An owner represents a level of abstraction and control for administration purposes and is not a strict requirement for the selection and dissemination of a beacon's information content.

Determining beacons for which to disseminate their information content requires the evaluation of available beacons and the selection of qualified beacons. This process is called the beacon selection process. Beacons are selected based on three main criteria: time, content class, and geographic location, although other parameters may be present (typically descriptive terms, such as "cheapest"). Content class is not required for a system where all information is homogenous, that is, of one content class. Time is not required for a system where all beacons are persistent and do not contain scheduled times. The evaluation process yields a qualified set of zero or more beacons called the candidate beacons.

As beacons can represent common geographic locations, content classes and times, multiple beacons are likely to form the candidate beacons set. A process of beacon arbitration is used to select a single candidate beacon from the candidate beacons set. Various algorithms for beacon arbitration processes may be applied. In a preferred embodiment, the beacon arbitration process is called the Highest Priority Index. Once calculated, a candidate beacon with the highest priority index is selected and the Highest Priority Index process calculates and records a new priority index associated with the beacon facilitating the next iteration of the process. The process returns information identifying the beacon to be disseminated and therefore facilitating the dissemination of the beacon's information content. The process may be called repeatedly to obtain a list of qualified beacons.

A feature of the system is its ability to target advertising to a requestor based on information provided by the requestor. This feature allows the advertising to be precisely targeted, as the system may know where the requestor is, where they are going, and what they are looking for.

The system allows advertisers to precisely target users of the system, by first associating the advertisement with street segments, for example a twenty four hour restaurant advertisement is associated with a series of street segments which actually surround a nearby gas station. The advertisement is associated with "gas stations" as the object, no time limitation, and "cheapest" as a further parameter. in another example, a restaurant advertisement is associated with series of street segments located around a nearby hotel. The object is "accommodations", the time is 2:00 p.m. to 8:00 p.m. and the further parameter is "best".

The process of playing an advertisement, i.e. a beacon with advertising content, may be as follows:

(1) The advertising object specifies a series of one or more audio advertisement which will be played to the caller as well as a response grammar.
(2) During the advertisement, the caller is asked to respond with a particular acknowledgment. For example:

| | |
|---|---|
| System: | (for a Speed Reading Advertisement) Say "YES" if you would like to learn to speed read right now. |
| Caller: | Yes |
| --Alternate-- | |
| System: | (Club/Restaurant Advertisement) Say "YES" if you would like to make a reservation right now. |
| Caller: | Yes |
| --Alternate-- | |
| System: | (Coupon Advertisement) Say "YES" if you would like to receive our bookmark in your email. |
| Caller: | Yes |

(2) If the caller's response is affirmative the appropriate fields are changed and the request satisfied by collecting more information if necessary, and typically by contacting the advertiser to provide the information.

The requestor's area of search based on the request may not be the only location reference used for location based advertising or content. The requestor's location of interest (i.e. area of search) may not be the user's location or represent a location between the requestor and the area of search. Thus, any or all of the user's location of interest, actual location, and the area between the two, may be used for providing targeted location based advertising.

Figure 22:
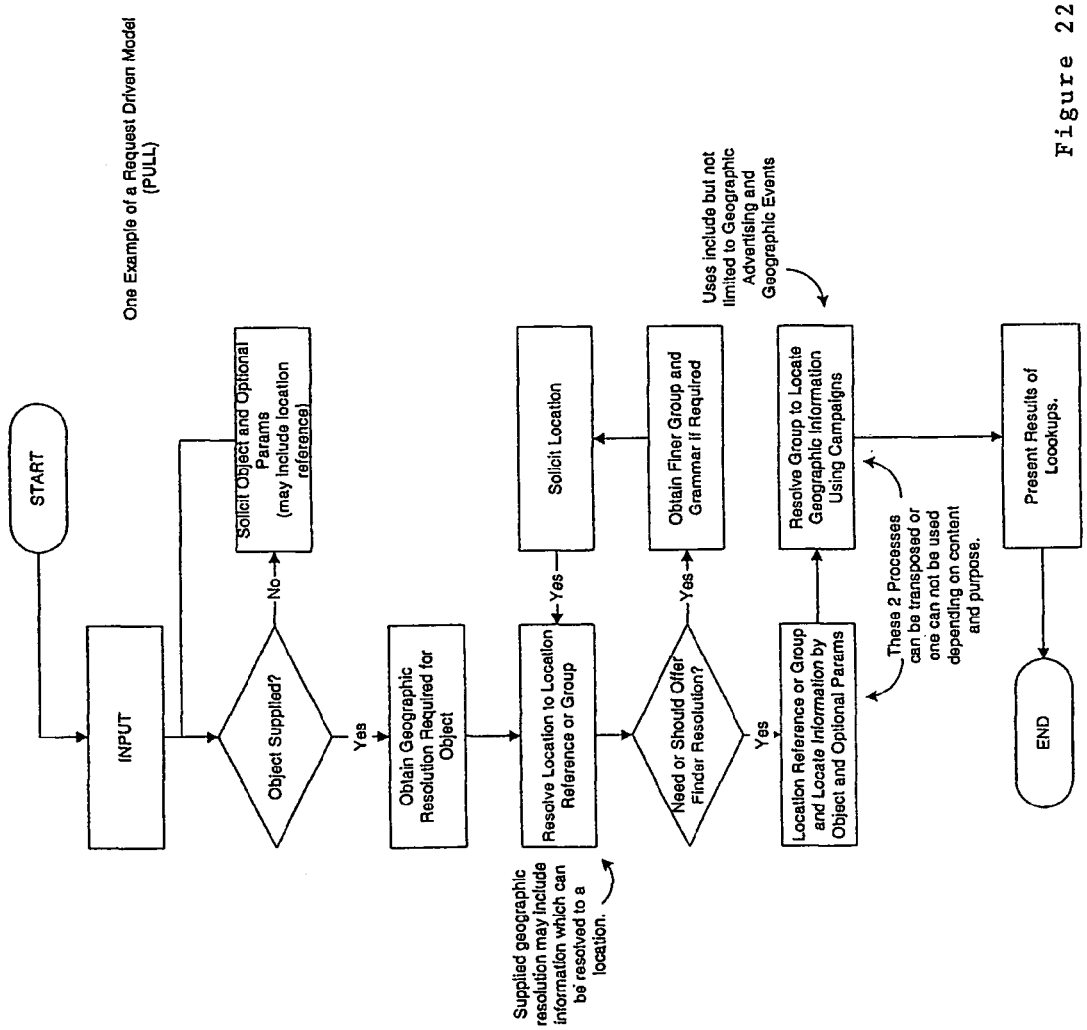
FIG. 22 is a flow chart showing the processing of a request driven beacon.
Figure 23:
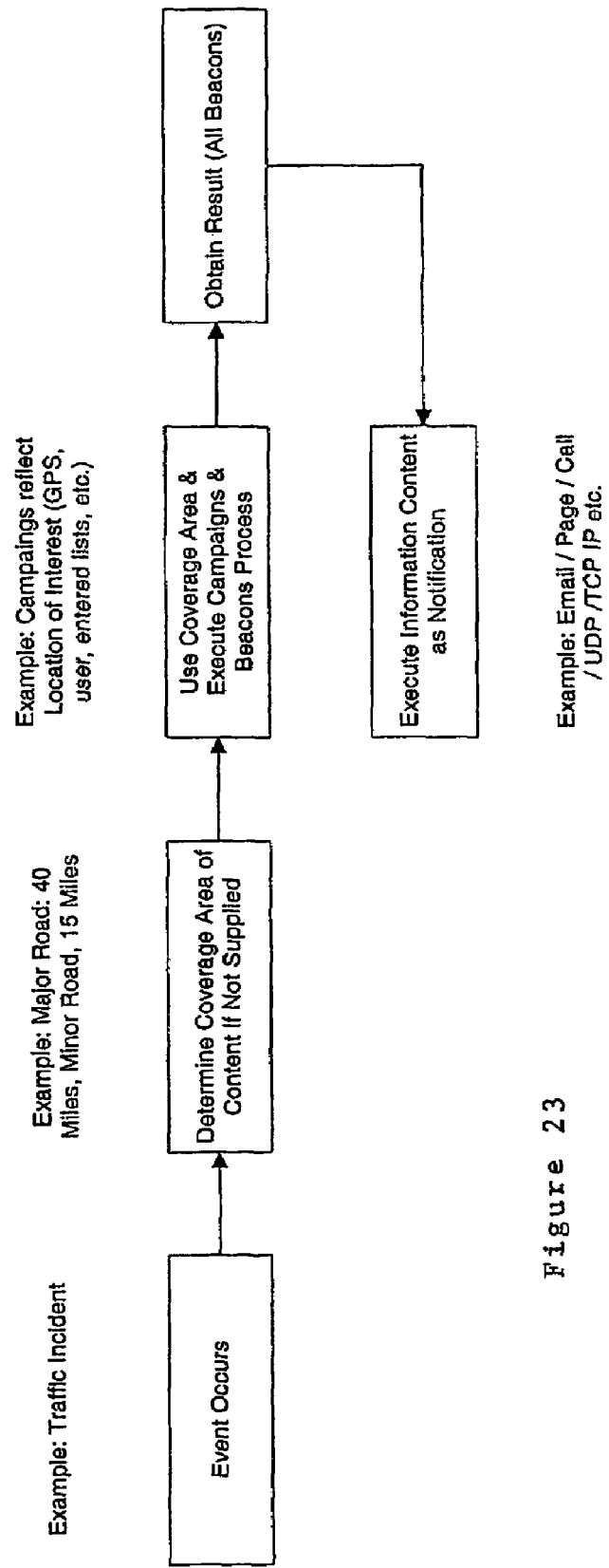
FIG. 23 is a flow chart showing the processing of an event driven beacon.

Advertising (or other beacons) may be "pushed" to a receiving party or "pulled" by a receiving party. FIGS. 22 and 23 show flow charts demonstrating the different processes taken by the system.

The targeted advertising need not be based solely on street segments. The method by which targeted advertising is provided is equally applicable to other location determination technologies such as GPS or triangulation.

Routing

The system is also capable of providing directions for an information requestor. in a preferred embodiment of the method, the following steps may be taken:
   (a) Step 1 Security check against member tables (memtyp & memtypdat) to determine if this feature is available for the requestor.
   (b) Step 2 Process input parameters provided by requestor to get Starting Point (Lng1, Lat1) and Destination (Lng2, Lat2).

The starting points may be an existing address or an intersection of two streets, as may the destination.
   a. If a starting address is given, check whether it exists in our database by calling a subroutine. If it does, go to Step 2-b, otherwise go to Step 2-c.
   b. Get the two nearest intersections of the starting street segment. Go to Step 2-e.
   c. If a starting address is not given or not found in our database, check whether two streets are given for the starting point. If the starting address is found in the database, go to Step 2-e, otherwise exit function and return an error message.
   d. If two streets are given for the starting point, check whether an intersection exists between the two streets. If there is an intersection, go to Step 2-e, otherwise exit function and return an error message.
   e. Repeat the above process to get the similar information of the destination.
   f. If either the starting point or the destination is determined by a given address, decide the Starting Intersection and the Ending Intersection based on the information obtained about the starting point and destination using the following criteria.
      1. The crossing street has higher class, such as Secondary, Major, or Highway
      2. The distance between two intersections are the shortest.
   (c) Step 3 Determine the Distance Unit and Set Output Format. If necessary, assign the default values.
   (d) Step 4 Get the Collection-of Segments for the Route Found.
   a. Determine the distance between the starting intersection (Lng1, Lat1) and ending intersection (Lng2, Lat2).
   b. Start from the starting intersection, choose next segment according to the following five Priorities:
      1. Top Priority—Best Segment: The segment is the sole segment that can be chosen or the segment belongs to the same Street as one of the two streets which form the ending intersection.
      2. 2nd Priority—The Shortest Distance: The class of segment is not "Local" and choosing the segment leads to the shortest distance.
      3. 3rd Priority—The Same Street: The street of a segment is the same as that of the previous segment chosen.
      4. 4th Priority—The second record: The second record will be chosen if the actual distance to the End Intersection caused by choosing it is shorter than that caused by choosing the first record.
      5. 5th Priority—The shortest Distance
   c. Repeat Step 4-b to obtain all segments towards the ending Intersection, until accessing the ending Intersection.
   d. For each segment returned in Step 4-c, check the segment against the existing collection of Segments chosen, and if it has already been in the collection, tag this segment and all segments following this segment Useless, remove all of them from the Collection, and find a new desired segment repeat Step 4-b by using the information of the last segment in the Collection that is not tagged useless.
   (e) Step 5 If There is a Starting Address, Add Half of The Segment where the Starting Address belongs to the beginning of the Collection of Segments for the Route Found in Step 4
   (f) Step 6 If There is a Destination Address, Add Half of The Segment where the Destination Address belongs to the End of Collection of Segments for The Route Found in Step 4
   (g) Step 7 Determine The Actual Number of Blocks in The Route Chosen and Check Whether There Is a Valid Intersection in Every Two Subsequent Segments Found in Step 4.
   (h) Step 8 Determine The Turning Direction Between Streets in The Route Chosen.
   (i) Step 9 Output The Route Chosen as a String in the Desired Format Targeted Advertising Routing The method and system can also provide a requestor a route that takes them by certain points of interest, thereby providing advertisers the ability to play an advertisement for a requestor, and then have the requestor routed by the advertiser. As well, parties can pay to have requestors routed by them (perhaps only if the requestors meet certain criteria.

For Example:

(1) A requestor requests driving directions from an information source via a cellular phone. After indicating her departure and destination points, she's about to be provided with driving directions. Immediately prior to the provision of the driving directions, she's provided an advertisement for a McDonald's fast food restaurant which has sponsored her request. As she drives to her destination she observes she passes by a McDonald's restaurant.

(2) A requestor engages his internet enabled mobile phone to locate a hotel with vacancies. After his query is processed, he's offered directions to the inn which he accepts. The directions, comprised of 5 turns, appear as "step by step" screens (cards) on his mobile device. Between steps 2 and 3, Joseph is presented with a marketing message and coupon for a Jazz Club on the street he's about to turn onto.

The process manifests navigational aids which, such as walking or driving directions, which direct the user past one or more specific locations and/or along one or more street blocks. The process may integrate "messages" (audio, text, or visual or combination thereof) into the directions. This allows "route-points" to be sold to points of interest which become part of route-finding (refer to the above user scenarios). When directions are required, candidate route points are selected and the direction in fact "directs" the user past, along or by one or more "route-points". Route-points could be store locations or other points of interest where traffic is desired (e.g. pass by billboards, tour stops, etc.).

A preferred embodiment of such targeted routing includes the following steps:

(1) Obtain Routing Points. Routing points are locations which the final directions, if followed, cause the requestor to pass by, along or through. Different processes can be used to select routing points. For example, one process which can be used is the "bounding box" method. The bounding box method defines a square area by longitude and latitude computation where all of the points required in the routing directions are contained. The bounding box method then determines all of the street segments which are either completely or partially within this area. These segments are then passed to other processes as criteria upon which to evaluate what, if any, route points exist and which ones will be used. The purpose of this step is to obtain a list of routing points.

(2) Order the Routing Points. If an "order" is to apply to the routing points, for example, when more than one routing points will be used, then such routing points must be ordered.

(3) Determine Directions The process calls a route-finding process such as described above. Route finding processes determine a route between two or more points and may include provisions for route characteristics such as most efficient, simplest, preference for speed, etc. Any route-finding process known in the art is suitable. The process calls the route-finding process as many times as required to accomplish the task. For route-finding processes which only provide output for two points, multiple calls will be required. For route-finding processes which can handle an arbitrary number of points, more route-points can be passed.

(4) Using the example route finding method described above, the route-finding process will be called a number of times in relation to the number of route-points to be included. In this scenario, the first step is to supply the point of departure and the first route-point as the origin and destination. The next step will be to supply the first route-point and the next as the origin and destination. This repeats until all route points have been computed at which time the process is called a last time supplying the last route-point and desired destination as the origin and destination points. The resulting output is a route-plan which passes along, through or by one or more route points.

(5) Result Output. The resulting route-plan is formatted as desired and, optionally, references or content can be applied to the output where appropriate to indicate the route points. For example, when rendering a map, a route point can be "highlighted" or "marked" and include the data to be imposed on the rendering or a reference which can be used to draw a relationship to the route point in a subsequent process.

Preferably the process couples targeting advertising to the requestor with the results of a route-planning to process to provide targeted information and advertising as applied to route-planning. This process is "interface independent" meaning that the actual information, promotional or advertising content, "message" may be interpreted by a subsequent process suitable to a particular device or interface. For example, the message may contain a reference to a stored audio recording, a reference to a stored graphic or visual, or a unique coupon number represented as text.

This method is carried out using Active Geographic Specifications, i.e. objects which encapsulate a geographic definition. An Active Geographic Specification may embody any combination of addresses, intersection references and street segment (block) references. An Active Geographic Specification encapsulates this information as a arbitrary list of types and data.

For example, a Geographic Specification may embody an address and the street segments 2 blocks around the address. Alternatively, it could specify a particular route composed of a list of street segments. Active Geographic Specifications are used in conjunction with the output from a route-plan and define the geographic location(s) for which a message applies.

Sponsored Geographic Specifications are identical to Active Geographic Specification in terms of construction, but have a different purpose. If the method deems a message as being appropriate to apply to the route-planning results, the geographic information contained in the Sponsor Geographic Specification may be used as additional output. For example, the Sponsor Geographic Specification could be used to highlight a location on visual navigation aid on route.

A Schedule Specification is an object which encapsulates a schedule. Schedules reflect dates and times, date and time ranges. For example, a Schedule Specification may embody the days of the week Monday through Friday and the times 8 am to noon. alternatively, a Schedule Specification may embody a definition specifying the first week of every month, 24 hours a day.

Delivery Specification is an object which encapsulates one or more Active Geographic Specifications and an one or more associated Schedule Specifications. The resulting object embodies a geographic space and time definition through its Geographic and Schedule Specifications.

Content Specifications are objects which encapsulate a content type, content location and content or content reference. Content type reflects the type of content as applied to an interface (for example, "text" indicated the content is designed for delivery as a text message). Content location indicates the location of the content (for example, a content location of "url" indicates that the content parameter is a url specifying the location of the content). For example, a content specification might embody a reference to a record audio as its content and use the keyword "audio" as its content type. Alternatively, a Content Specification could have a text message, "Eat at Joe's" and the content type set to "text".

Message Specification is an object which encapsulates a Content Specification, Sponsor Geographic Specification and a Delivery Specification.

Campaign Specification is an object which encapsulates one or more Message Specifications. Thus, a Campaign Specification embodies one or more messages and associated geographically and supporting elements.

The objects seen in FIG. 20 represent a data structure and data relationships which provide the requirements to associate content with geographic location and, optionally, dates and times. The design allows for different messages associated with different locations and different message content types. The design also supports the ability to specify particular geographic information relative to the message, for example, to store locations representing the sponsor of the message.

Any suitable route-planning method can be used. The results from a route-planning method must be parsed so that the pared output can be applied against the Active Geographic Specifications which are active bases on their associated Schedule Specifications. The process for parsing route-planning results varies greatly based on the formatting of the route-plan and additional data in the route-plan which can be applied.

An overview of a preferred embodiment of the process follows:

1. Based on the point of origin and the route-plan's "legs", the route-plan's directions are parsed into a representation which includes segments, intersections and addresses. These representations reflect the same type of content as an Active Geographic Specification but reflect the route to be taken by the requestor. The resulting list is called the "Route Geographic Specification".
2. For each address, intersection or street segment identified in the Route Geographic Specification, an evaluation takes place. Each entry in the Route Geographic Specification is called a Route Geographic Specification Entry or "entry". An evaluation of all Active Geographic Specifications is made. Entries which are also found in Active Geographic Specification become a "candidate" and the Active Geographic Specification's id is retained.
3. For each candidate Active Geographic Specification, associated Delivery Specifications are retrieved allowing the Active Geographic Specification's Schedule Specification to be evaluated. Based on the current date and time in the Active Geographic Specification and the associated Schedule Specification, candidate Active Geographic Specifications are further qualified or rejected.
4. The next process is Content Specification qualification which ensures that the content type matches those indicated at the instigation of the process request. For example, content with a content type of "WAP" is not generally usable in an audio delivery. To achieve Content Specification qualification, the remaining candidate Active Geographic Specification's associated parent Delivery Specifications are obtained and put in a list. For each Delivery Specification, the associated parent Message Specification is obtained and put in a candidate list. For each Message Specification candidate, the associated Content Specification is evaluated to ensure a match with the requesting system's "supported content types" parameter if one was provided. If one was not provided, candidates are presumed valid. Candidate Content Specifications and associated Message Specifications are retained in separate lists. The resulting Candidate Message Specification list will reflect messages which apply to various "legs" of the route-plan; i.e. addresses (way points), street segments and intersections.
5. The resulting Candidate Message Specification list is then applied to another process suitable for message dissemination and inventory management. Such a process may be a simple "least-recently-delivered" process whereby the least-recently delivered message becomes the message to be delivered or may reflect a more elaborate mechanism whereby weighing and ratios are applied. The result of this process however, is to isolate a single Message Specification from the candidate list for delivery which completes the overall process.
6. The candidate Message Specification content information is returned to the calling system. If the calling system's content requests it, Sponsor Geographic Specification information may also be supplied.

The aforementioned discussion details a mechanism and process whereby information, promotions and advertising (content) can be geographically "associated" with navigational route-planning. The result is that the route-plan can contain additional information pertinent to the route. The process supports abstract addresses, intersection and street segment information (geographic information), date and time data (schedule information) and content and content descriptions (content information) to maintain associations for this purpose. The process is device agnostic, i.e. the content can be applied to any interface or medium.

Generally, the process is used to solicit advertisers to sponsor route-planning services based on geographic proximity. This introduces a revenue stream which can support the costs of providing the route-planning service for free to the end user.

The process can be modified to support "Content Geographic Specifications". Content Geographic Specifications define an additional association between geographic definitions (such as an address or street segment) and the Content Specification. This association allows content to be matched to addresses, street segments and intersections. For example, the a way point in the route-plan may be for a theatre and such an association would facilitate content being applied based on the fact the way point is a theatre. Another example could identify that the point of origin in the route-plan is a hotel thereby allowing a relationship to be evaluated with the content again; for example, a tourist attraction message, to be provided.

The process provides two options. An advertisement can be bound to a route, i.e. provided to the requestor when the route includes segments selected by the advertiser. Alternatively, the route can be bound to the advertiser, i.e. the route will send the requestor by the advertiser's place of business.

Sample Uses

The above described methods and system can be applied to a wide variety of technologies. For example the targeted advertising can deliver commercial grade media scheduling; e.g. multiple advertisers each running multiple campaigns in geographically. Potential geographically target messages include: campaigns for an area, delivery area, marketing area, messaging area, notification area, etc. Other examples follow:

Yellow Pages—(An example of locating objects by voice) A requestor places a telephone call which is handed by an interactive voice response (IVR) system. The system asks for the type of business or the name of a business the requestor is interested in locating and the geographic area of interest. The system provides a listing of such business, after playing an advertisement for the requestor. This example can include such uses as classifieds, reservations, shopping, traffic, movie locator, traffic reports, friend finder, CRM, work force, and field service. A reward system can be implemented using the method and system according to the invention.

Other examples:

EXAMPLE #4

Mary is in the lobby of her downtown Vancouver, Canada hotel. She's on her way to meet a client at the Queen Elizabeth Theatre but needs walking directions. Using here internet enabled mobile phone, she engages a travel site which offers walking directions. After providing her point-of origin and specifying her destination, she's provided with suitable walking directions. The walking directions carry a message, "After the theatre—La Plaza Dor Italian Coffee and Dessert Bar—Coffee and Dessert Specials". Mary not only has her walking directions, she now has an establishment to take her client to after the show.

EXAMPLE #5

Joseph is driving in his car and uses an in-vehicle navigation aid to determine the address and driving directions to a local plant nursery. After his making his request, the in-vehicle navigation aid displays a visual map with his route-plan highlighted. The navigation aid shows the destination nursery and 3 blocks away, a home renovation center location is also shown.

EXAMPLE #6

Veronica is a home and desires driving directions to a restaurant she'll be meeting some friends at. She calls a voice portal and requests the driving directions to a given address. She's provided directions and she hears an ad promoting a club near her chosen establishment.

The system and method can also be used with Personal Information Managers ("PIMs") and Contact Manager Software. PIMs are a type of software application found on most PDA devices and mobile phones that allows requestors to enter text for any purpose and retrieve it based on any of the words you typed in. Typical features include a telephone list, calendar, scheduler, reminder and calculation functions. Contact Manager Software is a type of software application that allows requestors to store and manage contact information. Contact information generally includes an individual's name, related phone numbers, addresses, dates and organization or business company name.

Personal Information Managers (PIMs) and Contact Managers generally provide similar and overlapping functionality, particularly in terms of the storage and retrieval of telephone lists or contact information. The terms PIM and Contact Manager are generally used interchangeably.

Herein, the terms "personal information manager", "PIM" and "contact manger" may be used interchangeably. The term "contact manager" refers to telephone and related information for people and entities such as businesses, organizations and group.

PIMs store information in a variety formats and methods. The information store for PIM information is termed the PIM database. PIMs may provide additional functionality which allows other software applications to read and write information or otherwise manipulate the PIM database. The ability to read and write information to the PIM database, either directly or indirectly (such as through direct computer file manipulation or without supplied additional functionality) is herein termed as the PIM API.

A software component, called a PIM Interface implements the functions provided by the a PIM API. Various PIM interfaces are developed as required for the various PIMs available. For example, a PIM Interface for Microsoft Exchange Server 2000 provides the functionality of reading and writing contact information to the Microsoft Exchange 2000 Server PIM database. A PIM interface may simply interact with a common tab-delimited text file to read and write contacts information.

The method according to the invention provides for interfacing and enhancing PIM information through various devices such as wireline and wireless phones, internet enabled (WAP) phones, and personal computing devices (handheld and otherwise). Examples of enhancing PIM information via the method and system described herein include (a) driving directions to contacts by contact reference in the PIM, (b) allowing the input of contact names which do not exist within the PIM database but which are handled via other mechanisms, (c) providing prompting to allow users to engage in transactions relative to a contact, and (d) providing lists of contacts geographically located in a user defined area.

EXAMPLE #7

Driving Direction by Contact Reference. John calls a phone number which is hosted by an interactive voice response system and which provides interaction with his PIM. John states "How do I get to Linda's office?". The system obtains John's present location through any of various location determination technologies and subsequently provides directions to Acme Co., Linda's place of work. This scenario can be applied to other interfaces such as WAP.

EXAMPLE #8

Out-of-Set Contact Handling (Non-Existing Contacts). John calls a phone number which is hosted by an interactive voice response system and which provides interaction with his PIM. John states "Home Depot" but his PIM does not have contact information for Home Depot. The application examines another database of entities which have paid to provide response to various terms. Home Depot is represented in the database. Contact information for Home Depot and other call handling options are presented. The same process can be applied to other interfaces, such as WAP or internet, for contact handling.

EXAMPLE #9

John calls a phone number which is hosted by an interactive voice response system and which provides interaction with his PIN. At an appropriate point in the application, John is notified that Linda's birthday is tomorrow and is asked if he would like to send a flowers or gift basket. John responds affirmatively. The application commences a transaction with a vendor to fulfill the transaction. John is either billed as part of a service package, may be charged to his phone number, or via other means. This scenario can be applied to other interfaces such as WAP.

EXAMPLE #10

John calls a phone number which is hosted by an interactive voice response system and which provides interaction with his PIM. He has asks the system "what customers do I have around me.". The application solicits John's location through any of the various location determination methods available (GPS, TDOA, GSR, etc.) and returns by stating the name s of companies in John's area. This scenario can be applied to other interfaces such as WAP.

The process by which such examples are accomplished includes the steps of:
(1) Contact References by Name. A list of all contact names is generated by company name and individual name. Permutations and variations of each entry are included in the list as well. This allow for partial referencing. For example, Ms. Linda Evans; would have an entry as Linda, Evans, and Ms. Evans. Acme Co. would have an entry for Acme, Acme Co and Acme Company. This Contact Reference by Name list forms the foundation for building voice recognition grammars and optionally other interfaces if appropriate.
(2) Grammar Building. The Contact Reference by Name list is further transformed into a normal grammar syntax suitable to speech recognition processes. Verbs for various actions are applied to allow sentence structure if appropriate. For example, "how do I get to Linda's office", "how do I get to Linda's home" where "how do I get" represents verbs and "Linda" represents the contact reference. This grammar augments direct command grammars which only represents actions such as "driving directions" and to which the contact is subsequently solicited.
(3) Contact Resolution—through the appropriate interface(s) (voice-xml, WAP) the requestor is asked to remove contact ambiguity if it exists. For example, "call Linda" could be a valid statement however there could be more than one Linda implied by the reference. Resolution processes may engage the requestor to identify the correct contact although preferences settings and other processes can assist in this process.
(4) Attribute Resolution—through the appropriate interface(s), the requestor is asked to remove ambiguity pertaining to the contact's attribute should any exist. For example, "how do I get to Linda's" is a valid statement however, if there is a work address and home address for Linda, more than one location is implied. Resolution processes may engage the requestor to identify the correct attribute although preference settings and other process can assist in this process.
(5) Action Interpretation—the verb is resolved to an action handler and any resolved parameters are provided to the sub-process. For example if the verb is "call" then the Call Handler is invoked with any parameters which could include the phone number. If the verb is "directions" then the Directions Handler is invoked with any resolved locations.

The method and system can also be used to form user created groups. For example the system can solicit street names and intersections from the user or poll an automatic location identification device, resolve the location references to segments and store the segments in a group associated with the user. The segments and subsequently associated businesses are determined for the purposes of delivering geographically targeted messages, advertising, and events. Said stored segments can be applied to specific content classes.

The system according to the invention may use a process by which a location reference, obtained by voice, text, GPS, wireless device, or other means including LTD is used to provide geographically considered information to a requestor and optionally facilitate interaction with such requestor. The system also can be used so that users in a mobile or immobile environment can access or be notified of information, such as, but is not limited to, classifieds, business locations, auctions, etc.

The system can be used to allow an advertiser or individual or business or other entity to select a geographic area within which to associate the dissemination of information. The geographic area can be comprised of a point with a proximity (such as but not limited to a distance around an intersection) or may be comprised of street segments or groups thereof or any combinations of these. The system can also be used to allow mobile business professional or service people or delivery people to identify or receive notifications of locations or clients requiring attention. The system may also be used to allow an information requestor to define an arbitrary geographic area with which to associate the request of information. The geographic area can be comprised of a point with a proximity (such as but not limited to a distance around an intersection) or a geographic area comprising street segments or groups thereof or combinations of these.

In the above examples, if and when the information becomes available in the geographic area, the user is presented with the information according to the user preferences and the method by which the user has accessed the system.

While the principles of the invention have now been made clear in the illustrated embodiments, it will be immediately obvious to those skilled in the art that many modifications may be made of structure, arrangements, and algorithms used in the practice of the invention, and otherwise, which are particularly adapted for specific environments and operational requirements, without departing from those principles. The claims are therefore intended to cover and embrace such modifications within the limits only of the true spirit and scope of the invention.

What is claimed is:

1. A method of providing information to an information requestor, the information requestor located at first location, comprising the steps of:
(a) an information source receiving a request for a business associated with a second location different from said first location, from the information requestor;
(b) said information source obtaining an utterance from said information requestor, said utterance identifying said business and a location reference associated with said second location, said location reference including a first street;
(c) using a voice recognition system to identify said business and location reference from said utterance by comparing said utterance to a grammar of street names and a grammar of businesses;
(d) associating said location reference with one or more street segments within a group of street segments, each of said street segments representing a block;
(e) determining a listing of said business by locating an address for said business associated with one of said street segments within said group; and
(f) said information source providing said listing to said information requestor.

2. The method of claim 1 wherein an advertisement is provided to said information requestor.

3. The method of claim 2 wherein said information source receives said request and provides said listing via phone.

4. The method of claim 3 wherein said location reference also includes a second street that crosses said first street.

5. The method of claim 4 wherein said business requested is a business within a type of business.

6. The method of claim 5 wherein said advertisement is provided based on the location reference of the information requestor.

7. The method of claim 5 wherein said advertisement is provided based on said second location.

8. The method of claim 2 wherein said advertisement is provided to said information requestor is further based on a time and the business requested.

9. The method of claim 2 wherein a route is requested and provided based on said location reference.

10. The method of claim 9 wherein said route is selected based on the location of an advertiser.

11. The method of claim 1 wherein said information provided is provided to personal information management system.

12. The method of claim 1 further comprising, before step (a): providing a database of street segments.

13. The method of claim 12 wherein said street segments are organized into groups.

14. The method of claim 1 wherein said group is a municipal territory.

15. The method of claim 1 wherein said group is a street.

16. The method of claim 1 wherein said group is segments grouped by said information requestor.

17. The method claim 1 wherein said group is segments grouped by an advertiser.

18. A method of providing information to an information requestor, the information requestor located at first location, comprising the steps of:
   (a) an information source receiving a request for a business associated with a second location different from said first location, from the information requestor;
   (b) said information source obtaining first and second utterances from said information requestor, said first utterance identifying said business and said second utterance identifying a location reference associated with said second location, said location reference including a first street;
   (c) using a voice recognition system to identify said business and location reference from said first and second utterances by comparing said second utterance to a grammar of street names and said first utterance to a grammar of businesses;
   (d) associating said location reference with one or more street segments within a group of street segments, each of said street segments representing a block;
   (e) determining a listing of said business by locating an address for said business associated with one of said street segments within said group; and
   (f) said information source providing said listing to said information requestor.

\* \* \* \* \*